United States Patent
Yuasa et al.

(10) Patent No.: US 6,595,888 B1
(45) Date of Patent: Jul. 22, 2003

(54) METHOD AND DEVICE FOR CONTROLLING TRANSMISSION OF AUTOMATIC TRANSMISSION

(75) Inventors: Hiroyuki Yuasa, Atsugi (JP); Yoshikazu Tanaka, Atsugi (JP)

(73) Assignee: Unisia Jecs Corporation, Kanagawa-ken (JP)

(*) Notice: Subject to any disclaimer, the term of this patent is extended or adjusted under 35 U.S.C. 154(b) by 0 days.

(21) Appl. No.: 09/644,584

(22) Filed: Aug. 24, 2000

(30) Foreign Application Priority Data

Aug. 25, 1999 (JP) .............................. 11-238231

(51) Int. Cl.[7] .............................................. F16H 61/08
(52) U.S. Cl. ........................................ 475/118; 475/120
(58) Field of Search ................................ 475/118, 120, 475/121, 122, 123; 477/143, 155; 701/51

(56) References Cited

U.S. PATENT DOCUMENTS 5,609,549 A * 3/1997 Usuki et al. ............... 477/125
5,800,309 A * 9/1998 Takiguchi et al. .......... 477/144
5,908,370 A * 6/1999 Kubo et al. ................. 477/143
6,068,576 A * 5/2000 Tsutsui et al. .............. 477/144

FOREIGN PATENT DOCUMENTS

| JP | 6-11028 | 1/1994 |
| JP | 6-341526 | 12/1994 |
| JP | 9-133205 | 5/1997 |

* cited by examiner

Primary Examiner—Ankur Parekh
(74) Attorney, Agent, or Firm—Sughrue, Mion, PLLC

(57) ABSTRACT

The present invention describes a method and a device for determining the direction towards which an input shaft rotation speed changes along with the release of a friction engagement element during transmission operation, and based on the direction of change, determining whether the transmission operation is a power-on state transmission operation or a power-off state transmission operation, and based on the result of determination, deciding either the release-side friction engagement element or the connection-side friction engagement element as the main object of control for performing the transmission operation.

9 Claims, 20 Drawing Sheets

FIG.2

|   | L/C | L&R/B | 2&4/B | H/C | R/C | L/OWC |
|---|-----|-------|-------|-----|-----|-------|
| 1 | ○ | ● |   |   |   | △ |
| 2 | ○ |   | ○ |   |   |   |
| 3 | ○ |   |   | ○ |   |   |
| 4 |   |   | ○ | ○ |   |   |
| R |   | ○ |   |   | ○ |   |

○ CONNECTION
● CONNECT AT FIRST RANGE
△ CONNECT AT DRIVE

METHOD AND DEVICE FOR CONTROLLING TRANSMISSION OF AUTOMATIC TRANSMISSION

FILED OF THE INVENTION

The present invention relates to a method and a device for controlling the transmission operation of an automatic transmission, and more specifically, to an automatic transmission operation control designed to perform transmission operation by alternating the connection between friction engagement elements, in which the control for releasing a friction engagement element and for connecting another friction engagement element is carried out simultaneously.

DESCRIPTION OF RELATED ART

Heretofore, an automatic transmission is known that is designed to control the connection and release of friction engagement elements through hydraulic pressure, and to perform the transmission operation by alternating the connection between friction engagement elements, in which the connection control and the release control of two friction engagement elements are carried out simultaneously (refer for example to Japanese Unexamined Patent Publication Nos. 6-341526 and 9-133205).

Even further, a transmission operation control technique appropriate for performing upshift transmission operation during a power-on status is disclosed in Japanese Patent Application Laid-Open Publication No. 6-011028.

Even during the same upshift transmission operation or downshift transmission operation, it is preferred that the transmission operation control characteristics or the engine torque control request during transmission operation and the like be varied, depending on whether the transmission operation is a power-on state transmission operation or a power-off state transmission operation, as disclosed in the above-mentioned Publication No. 6-011028. According to the prior art, the power-on state and the power-off state are determined according to the step-in quantity of the accelerator pedal (throttle opening).

The power-on state refers to the state where the driving wheel is rotated by the engine through a transmission mechanism, and the power-off state refers to the state where the driving wheel is not rotated by the engine.

The engine torque may be estimated based on the step-in quantity of the accelerator pedal. However, the estimated torque may differ from the actual engine torque. Therefore, according to the conventional method, it is difficult to determine the engine torque with high accuracy. Even further, the basis of judgement for the step-in quantity has to be changed according to various driving conditions, and therefore, there has been a need for a process related to selecting the basis of judgement. However, if the wrong basis of judgement is selected, the judgement resulting therefrom is also erroneous.

SUMMARY OF THE INVENTION

The present invention is aimed at solving the above-mentioned problems. The object of the invention is to provide a method and a device for accurately and easily determining whether the transmission operation is a power-on state transmission operation or a power-off state transmission operation, and properly switching the characteristics and the like of the transmission operation control accordingly.

Moreover, the object of the invention is to provide a method and a device for carrying out a suitable transmission operation process based on the determined result of whether the transmission operation is a power-on state transmission operation or a power-off state transmission operation.

In order to achieve the above objects, the present invention determines whether the transmission operation is a power-on state transmission operation or a power-off state transmission operation based on the direction to which the input shaft rotation speed changes when starting the release control of the release-side friction engagement element. Based on the determined result, different transmission operation processes are selected for different determination results.

According to such configuration, the invention determines whether the transmission operation is a power-on state (driven state) transmission operation in which the driving wheel is rotated by the engine, or a power-off state (non-driven state) transmission operation in which the driving wheel is not rotated by the engine. The determination is performed based on the direction to which the rotation speed of the input shaft (turbine rotation speed) changes when the release-side friction engagement element is released.

As the power-on/power-off state is determined based on the direction to which the input shaft rotation speed changes, there is no need to determine the level of the engine torque, and no need to adapt a judgement basis in order to determine the power-on/off status accurately and easily. Therefore, the present invention enables to accurately select the best transmission operation process.

Moreover, in order to achieve the above objects, the present invention is designed to compute the gear ratio based on the input/output shaft rotation speed of the transmission mechanism, and based on the direction of change of the gear ratio when the release control of the release-side friction engagement element is started, determination is made on whether the transmission operation is a power-on state transmission operation or a power-off state transmission operation. Based on the determination, the best transmission operation process is selected.

According to such feature of the invention, by determining the direction of change of the gear ratio, the direction of change of the input shaft rotation speed is determined indirectly, which leads to determining whether the transmission operation is a power-on transmission operation or a power-off transmission operation. When the power-on/power-off of the transmission operation is judged based on the direction of change of the gear ratio, there is no need to determine the level of the engine torque, and no need to adapt a judgement basis in order to determine the power-on/off status accurately and easily. Therefore, the present invention enables to accurately select the best transmission operation process.

Moreover, according to the invention, the term "gear ratio" refers to gear ratio=input shaft rotation speed/output shaft rotation speed.

Even further, based on the determined power-on/power-off status, the present invention selects either the release-side friction engagement element or the connection-side friction engagement element as the main object of control when changing the gear ratio to a post-transmission operation gear ratio.

The other objects and phases of the present invention will become apparent from the following description on the preferred embodiments of the invention with reference to the accompanied drawings.

BRIEF EXPLANATION OF THE DRAWINGS

FIG. 2 is a chart showing the relation between the gear level and the combination of connection between the friction engagement elements of the transmission mechanism;

DETAILED DESCRIPTION OF THE PREFERRED EMBODIMENT

Figure 1:
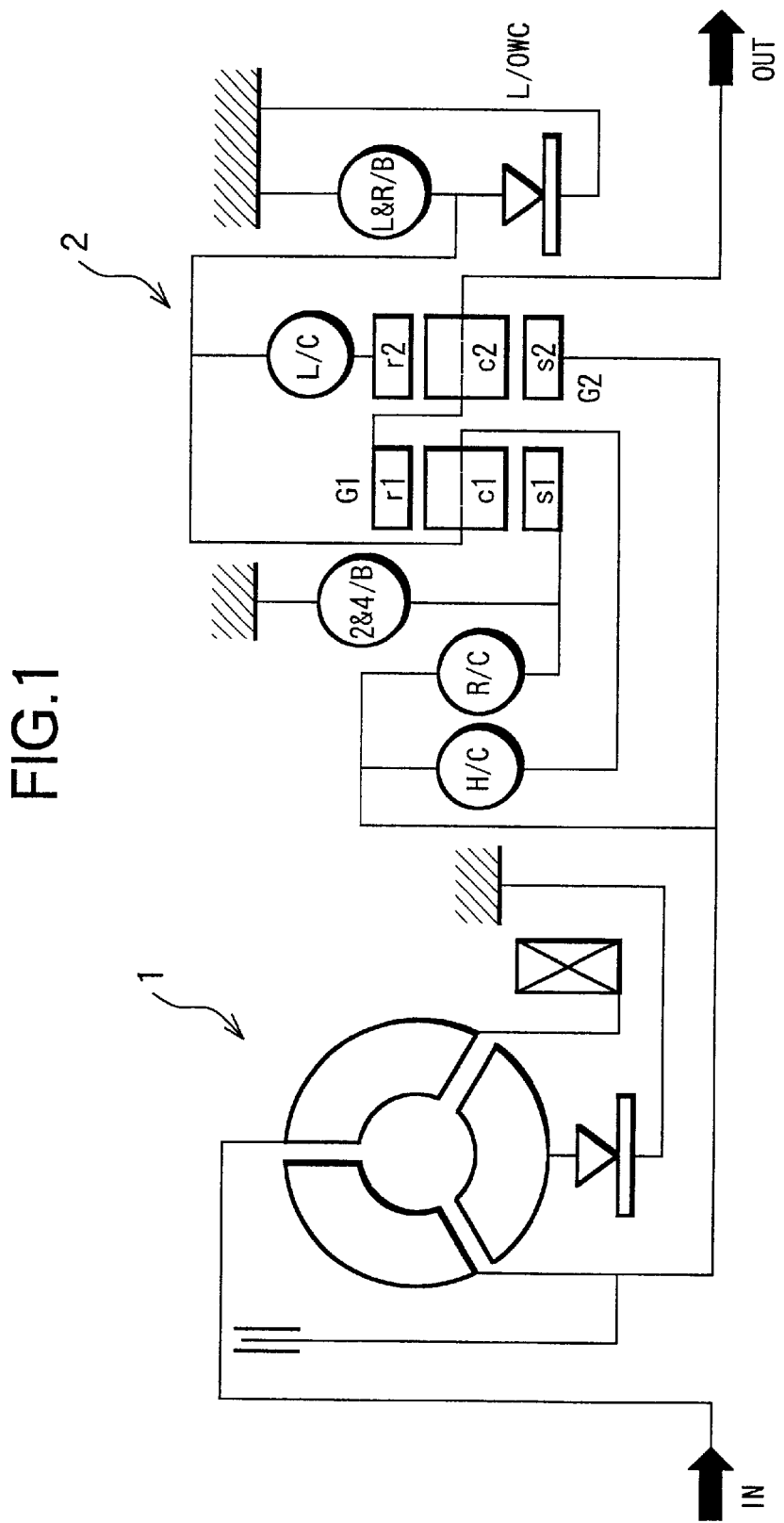
FIG. 1 shows the transmission mechanism of the automatic transmission according to an embodiment.

FIG. 1 shows a transmission mechanism of the automatic transmission according to an embodiment of the present invention. According to the embodiment, the output of an engine is communicated to a transmission mechanism 2 through a torque converter 1.

The transmission mechanism 2 comprises two pairs of planet gears G1 and G2, three pairs of multi-plate clutches H/C, R/C and L/C, one pair of brake bands 2 & 4/B, one pair of multi-plate brakes L&R/B, and one pair of one-way clutches L/OWC.

The two pairs of planet gears G1 and G2 are each a simple planet gear comprising a sun gear S1 or S2, a ring gear r1 or r2, and a carrier c1 or c2.

The sun gear S1 of the pair of planet gears G1 is positioned so that it may be connected to an input shaft IN through a reverse clutch R/C, and may also be fixed by a brake band 2&4/B.

The sun gear S2 of the pair of planet gears G2 is directly connected to the input shaft IN.

The carrier c1 of the pair of planet gears G1 is positioned so that it may be connected to an input shaft I through a high clutch H/C. On the other hand, the ring gear r2 of the pair of planet gears G2 is positioned so that it may be connected to the carrier c1 of the pair of planet gears G1 through a low clutch L/C. Furthermore, the low & reverse brake L&R/B is capable of fixing the carrier c1 of the pair of planet gears G1.

The ring gear r1 of the pair of planet gears G1 and the carrier c2 of the pair of planet gears G2 are each integrally connected to an output shaft OUT.

According to the transmission mechanism 2 mentioned above, the low through fourth speed gears and the reverse gear is realized by the combination of connection of each clutch and each brake as shown in FIG. 2.

With reference to FIG. 2, the circle mark shows the connected state, and the non-marked portion shows the released state. Especially, the black-circle mark shown in the low & reverse brake L&R/B of the low speed shows that the connection is only in the first range.

According to the combinations of connection of each clutch and each brake as shown in FIG. 2, for example, when the gear is downshifted from the fourth speed to the third speed, the brake band 2&4/B is released, and simultaneously, the low clutch L/C is connected. When the gear is downshifted from the third to the second speed, the high clutch H/C is released, and simultaneously, the brake-band 2&4/B is connected. When the gear is upshifted from the second speed to the third speed, the brake band 2&4/B is released, and simultaneously, the high clutch H/C is connected. When the gear is upshifted from the third to the fourth speed, the low clutch L/C is released, and at the same time, the brake band 2&4/B is connected. As above, the change gear related to changing the connection of the friction engagement elements by controlling the connection and disconnection (release) of the clutches and brakes (friction engagement elements) simultaneously is hereinafter called the alternate connection transmission.

Each of the above-mentioned clutches and brakes (friction engagement elements) is operated by supplied hydraulic pressure. The hydraulic pressure supplied to each clutch or brake is adjusted by various solenoid valves included in a solenoid valve unit 11 shown in FIG. 3.

Various solenoid valves of the solenoid valve unit 11 are controlled by an A/T controller 12. Signals from an A/T oil temperature sensor 13, an accelerator opening sensor 14, a vehicle speed sensor 15, a turbine rotation sensor 16 (input shaft rotation speed detecting device and input shaft rotation speed detecting means), an engine rotation sensor 17, and an airflow meter 18 are input to the A/T controller 12 controlling the various solenoid valves. Based on the result of these detection, the engagement pressure for each friction engagement element is controlled.

Figure 3:
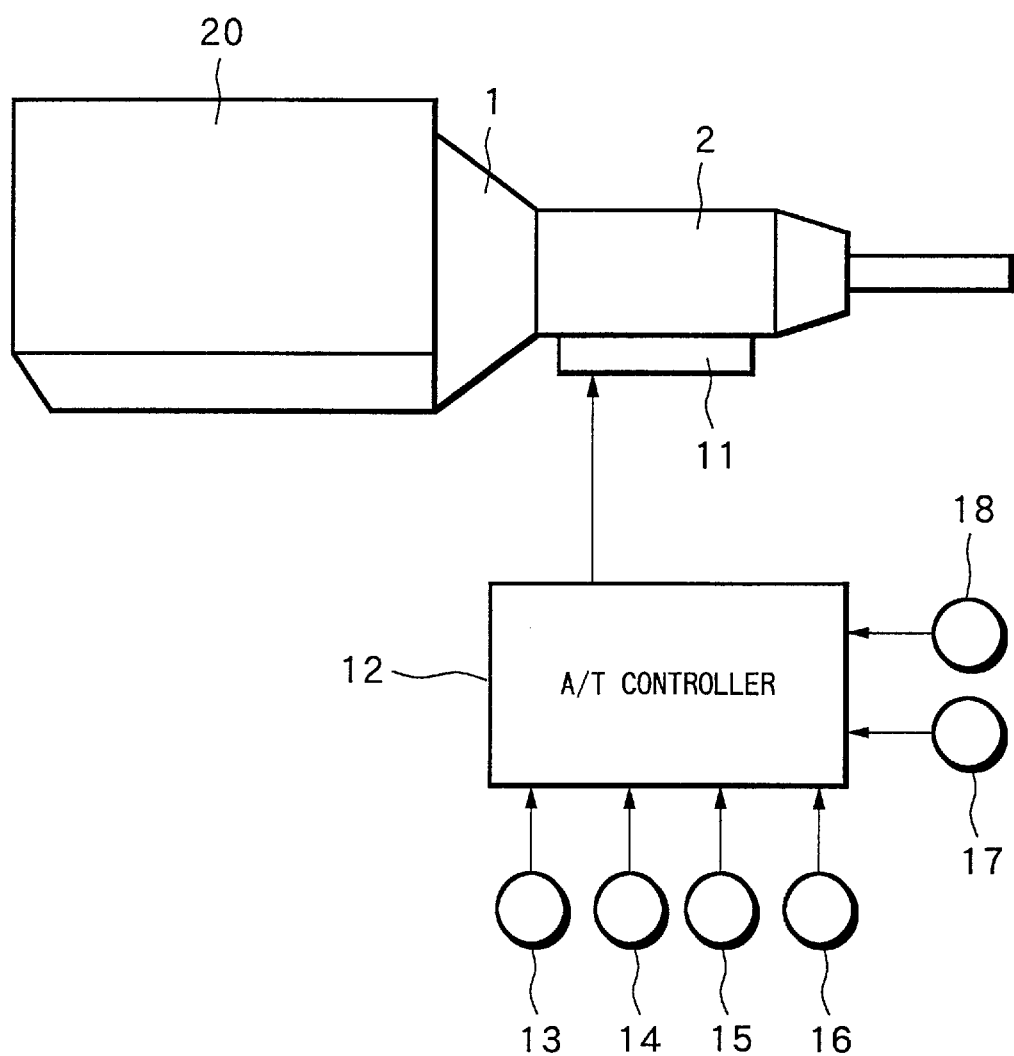
FIG. 3 is a system chart showing the control system of the automatic transmission.

Further, according to FIG. 3, reference 20 shows an engine in combination with the above mentioned automatic transmission device.

The operation of the alternate connection transmission according to the A/T controller 12 is explained with reference to the flowcharts of FIGS. 4 through 19.

Figure 4:
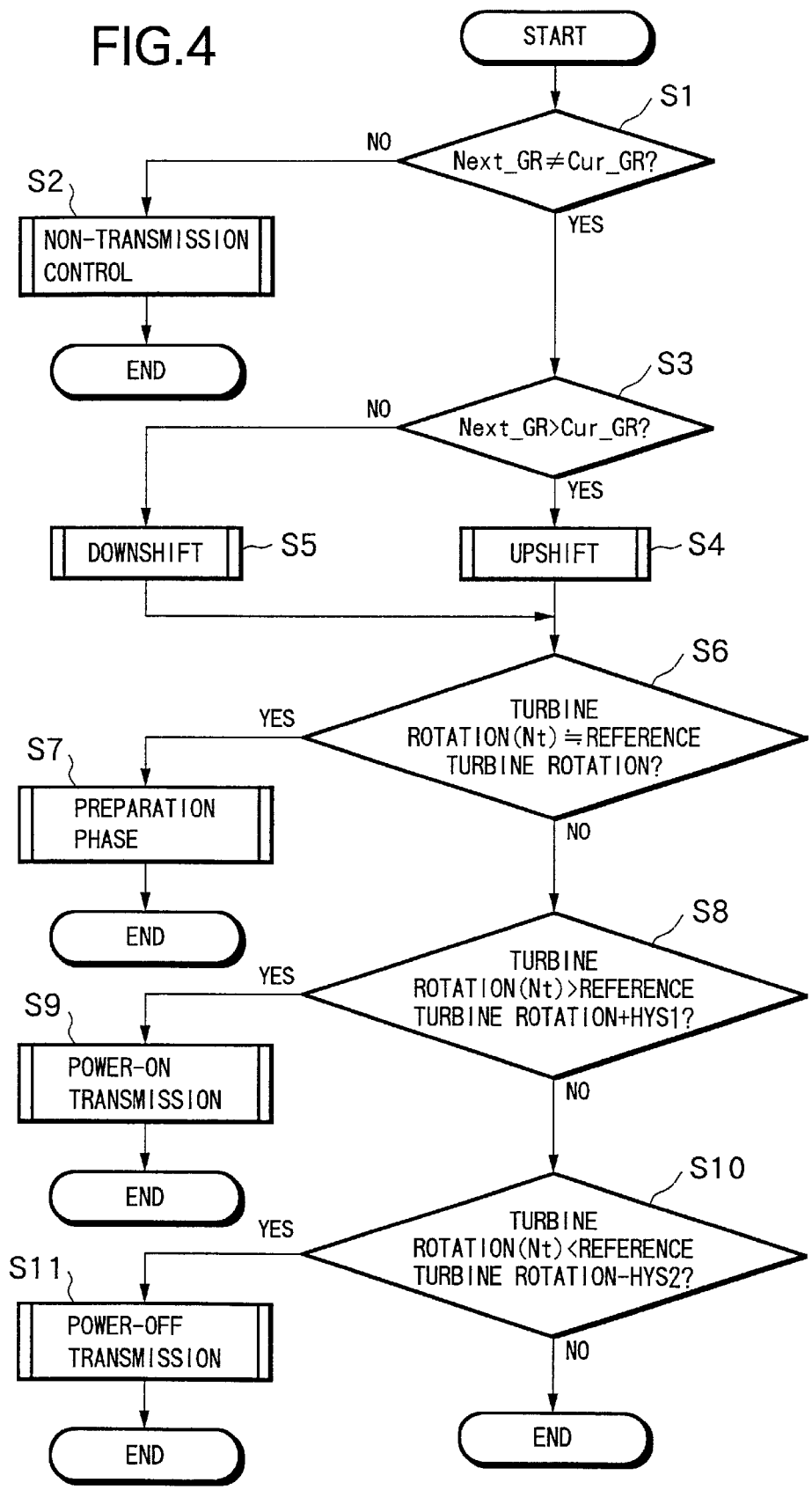
FIG. 4 is a flowchart showing the first embodiment of the control determining whether the transmission operation is a power-on transmission operation or a power-off transmission operation.

The flowchart of FIG. 4 shows the main routine for controlling the transmission operation, by determining whether the request is an upshift transmission operation or a downshift transmission operation, and by determining whether the transmission operation is a power-on transmission operation or a power-off transmission operation.

In Step S1, determination is made on whether transmission operation is necessary or not, by comparing the current gear Cur_GR and a gear NEXT_GR searched in a transmission operation map based on the accelerator opening and the vehicle speed.

When Cur_GR=NEXT_GR and there is no need of a transmission operation, the procedure is advanced to step S2, where the.engagement pressure of each friction engagement element is controlled according to the control specification during a non-transmission operation.

On the other hand, when Cur_GR≠NEXT_GR and there is a need of a transmission operation, the procedure is advanced to step S3, where determination is made on whether the gear NEXT_GR obtained from the map is higher than the current gear Cur_GR or not. Thereby, determination is made on whether the gear change is an upshift transmission operation or a downshift transmission operation.

When the gear NEXT_GR obtained from the transmission operation map is higher than the current gear Cur_GR, the procedure is advanced to step S4 where upshift is determined. In the other cases, the procedure is advanced to step S5, where downshift is determined.

In step S6, a reference turbine rotation speed (reference input shaft rotation speed) is computed based on an output shaft rotation speed No of the transmission mechanism and the gear ratio (input shaft rotation speed/output shaft rotation speed) of the gear before the transmission. In the present step, determination is made on whether or not the reference turbine rotation speed and the actual turbine rotation speed Nt (input shaft rotation speed) of the transmission mechanism substantially correspond.

The term "substantially correspond" refers to, in detail, the turbine rotation speed Nt at that time being included within the range defined by the reference turbine rotation speed−hysteresis value HYS2 and the reference turbine rotation speed+hysteresis value HYS1.

Until the release of the release-side friction engagement element is started, the reference turbine rotation speed and the actual turbine rotation speed Nt should substantially correspond. At that time, the procedure is advanced to step S7, where preparation phase process is performed.

The preparation phase process, as will be explained in detail later, is a process for gradually lowering the engagement pressure of the release-side friction engagement element from a non-transmission operation pressure toward a critical pressure, and at the go same time, controlling the engagement pressure of the connection-side friction engagement element to a stand-by pressure (refer to FIG. 20) to maintain it.

By the decrease of the engagement pressure of the release-side friction engagement element during the preparation phase process, the release-side friction engagement element starts to slide. As a result, when the turbine rotation speed Nt and the reference turbine rotation speed Nt differ, the procedure is advanced to step S8.

In step S8, determination is made on whether the actual turbine rotation speed Nt is higher than the total value of the reference turbine rotation speed and the hysteresis value HYS1 (for example, 10 rpm) or not.

When the actual turbine rotation speed Nt is higher than the total value of the reference turbine rotation speed and the hysteresis value HYS1, it is determined that the turbine rotation speed Nt has increased accompanying the starting of release of the release-side friction engagement element. In such case, the procedure is advanced to step S9, where power-on transmission operation is determined. Following the reference phase process, a power-on upshift control or a power-on downshift control is performed.

When the actual turbine rotation speed Nt is equal to or smaller than the added value of the reference turbine rotation speed and the hysteresis value HYS1, the procedure is advanced to step S10, where determination is made on whether or not the actual turbine rotation speed Nt is smaller than the value obtained by subtracting the hysteresis value HYS2 from the reference turbine rotation speed.

If the actual turbine rotation speed Nt is smaller than the value obtained by subtracting the hysteresis value HYS2 from the reference turbine rotation speed, it is determined that the turbine rotation speed Nt has reduced along with the starting of release of the release-side friction engagement element.

Then, in the above case, the procedure is advanced to step S11, where a power-off transmission operation is determined. Following the preparation phase process, the power-off upshift transmission operation control or the power-off downshift transmission operation control is performed.

That is, when the turbine rotation speed Nt is increased along with the starting of release of the release-side friction engagement element, it is presumed that the drive load of the engine is reduced during the driving state (power-on state) by the engine, resulting in that the rotation is increased (raced). Further, when the turbine rotation speed Nt is reduced along with the starting of release of the release-side friction engagement element, it is presumed that the engine is not at a driving state (power-off state).

As mentioned above, the transmission operation is distinguished between a power-on transmission operation and a power-off transmission operation. Even during the same upshift control or during the same downshift control, different transmission operation controls are to be performed for each of the power-on transmission operation and the power-off transmission operation.

Moreover, according to the above, the direction of change of the turbine rotation speed Nt (input shaft rotation speed) is determined by comparing the actual turbine rotation speed Nt with the reference turbine rotation speed based on the pre-transmission operation gear ratio, and thereby determining whether the transmission operation is a power-on transmission operation or a power-off transmission operation. However, the determination of whether the transmission operation is a power-on transmission operation or a power-off transmission operation may also be performed by computing the gear ratio (gear ratio=turbine rotation speed Nt (input shaft rotation speed)/output shaft rotation speed No) based on the turbine rotation speed Nt (input shaft rotation speed) and the output shaft rotation speed No, and comparing the computed gear ratio with the reference gear ratio.

Figure 5:
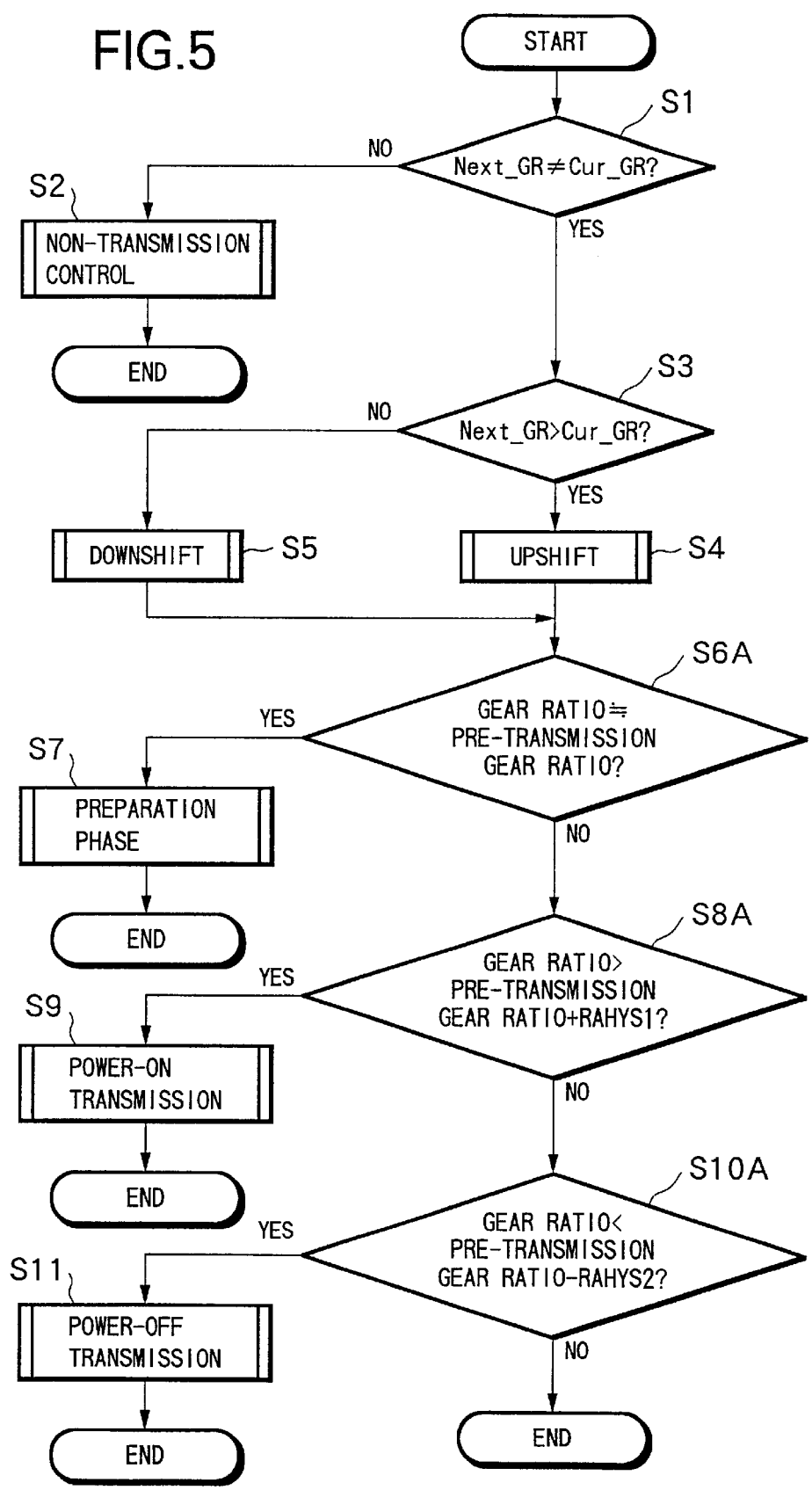
FIG. 5 is a flowchart showing the second embodiment of the control determining whether the transmission operation is a power-on transmission operation or a power-off transmission operation.

The flowchart of FIG. 5 shows the distinction between the power-on transmission operation/power-off transmission operation based on the above-mentioned gear ratio. Processes of the steps other than steps S6A, S8A and S10A are similar to processes shown by the flowchart of FIG. 4. Therefore, only steps S6A, S8A and S10A showing different processes will be explained.

In step S6A, the gear ratio is computed from the turbine rotation speed Nt and the output shaft rotation speed No. Then, determination is made on whether or not the computed gear ratio and the gear ratio according to the pre-transmission gear level substantially correspond. When the gears substantially correspond, the preparation phase process according to step S7 is performed.

Accompanied by the starting of release of the release-side friction engagement element during the preparation phase process, the turbine rotation speed Nt changes, and thereby, the gear ratio changes and becomes different from the gear ratio before the transmission operation. Then, the procedure is advanced to step S8A, where determination is made on whether or not the actual gear ratio is greater than the total value of the pre-transmission gear ratio and the hysteresis value RAHYS1.

When the actual gear ratio is greater than the value obtained by adding the pre-transmission gear ratio and the hysteresis value RAHYS1, it is judged that along with the starting of release of the release-side friction engagement element, the turbine rotation speed Nt is increased, and the gear ratio is thereby increased. The procedure is advanced to step S9, where power-on transmission operation is determined.

On the other hand, when the actual gear ratio is equal to or smaller than the value obtained by adding the pre-transmission gear ratio and the hysteresis value RAHYS1, the procedure is advanced to step S10A. In the step, determination is made on whether or not the actual gear ratio is smaller than the value obtained by subtracting the hysteresis value RAHYS2 from the pre-transmission gear ratio.

When the actual gear ratio is smaller than the value obtained by subtracting the hysteresis value RAHYS2 from the pre-transmission gear ratio, it is judged that along with the starting of release of the release-side friction engagement element, the turbine rotation speed Nt is decreased, and the gear ratio is thereby reduced. The procedure is advanced to step S11, where power-off transmission operation is determined.

Related to distinguishing the power-on transmission operation over the power-off transmission operation as above, the reference. (reference turbine rotation speed or reference gear ratio) is set based on the gear ratio at the gear level before the transmission operation. However, the power-on transmission operation and the power-off transmission operation can also be distinguished by setting the reference (reference turbine rotation speed or reference gear ratio) based on the gear ratio at the gear level after the transmission operation. Such distinction procedure is shown by the flowchart of FIG. 6.

Figure 6:
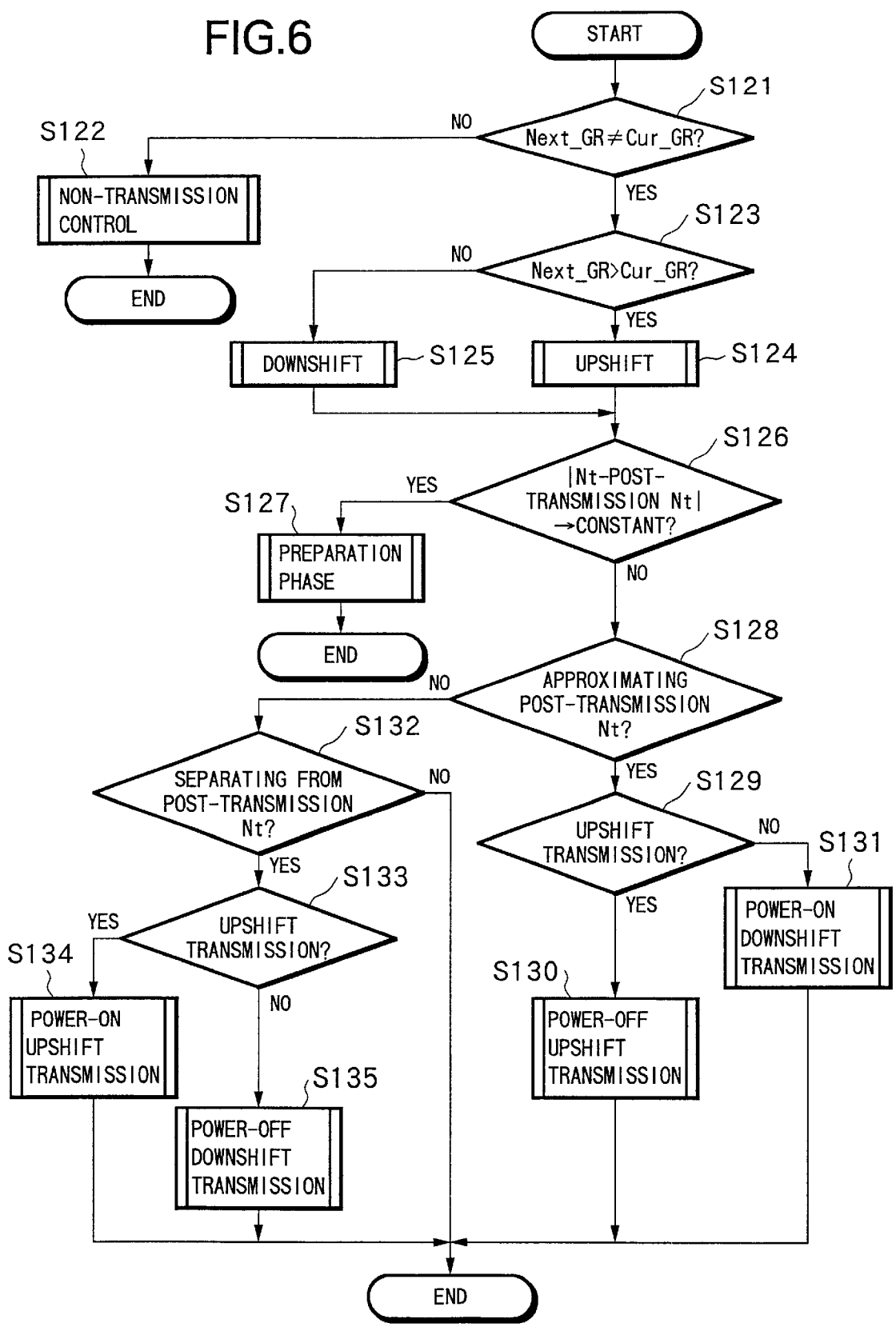
FIG. 6 is a flowchart showing the third embodiment of the control determining whether the transmission operation is a power-on transmission operation or a power-off transmission operation.

According to the flowchart of FIG. 6, steps S121 through S125 are similar to steps S1 through S5 of the flowchart of FIG. 4. Therefore, only steps S126 and the downward will be explained.

In step S126, determination is made on whether or not the deviation between the actual turbine rotation speed Nt of the transmission mechanism and the reference post-transmission turbine rotation speed which is obtained from the gear ratio (input shaft rotation speed/output shaft rotation speed) of the post-transmission gear level and the output shaft rotation speed No of the transmission mechanism is constant, and that the turbine rotation speed Nt is not being changed either to approximate or to separate from the reference post-transmission turbine rotation speed.

In the above determination, the change of deviation per unit time can be computed. In another example, the absolute value of deviation, that is the deviation between the reference post-transmission turbine rotation speed obtained from the output shaft rotation speed No and the gear ratio of the post-transmission gear level, and the reference pre-transmission turbine rotation speed obtained from the output shaft rotation speed No and the gear ratio of the pre-transmission gear level, is computed as the reference deviation ΔNts. Then, determination is made on whether or not the absolute value of deviation ΔNt, that is the deviation between the reference post-transmission turbine rotation speed and the actual turbine rotation speed Nt, and the reference deviation ΔNts substantially correspond.

When the turbine rotation speed Nt is neither varying in the direction approaching the reference post-transmission turbine rotation speed nor varying in the direction separating therefrom, the procedure is advanced to step S127, where preparation phase process is performed.

On the other hand, when change of the turbine rotation speed Nt is observed accompanied by the preparation phase process, the procedure is advanced to step S128, where determination is made on whether or not the actual turbine rotation speed Nt is approximating the reference post-transmission turbine rotation speed.

Actually, determination is made on whether or not the actual turbine rotation speed Nt is approximating the reference post-transmission turbine rotation speed based on whether or not the absolute value of deviation between the reference post-transmission turbine rotation speed and the actual turbine rotation speed Nt is reducing.

When the actual turbine rotation speed Nt is approximating the reference post-transmission turbine rotation speed, the procedure is advanced to step S129, where determination is made on whether or not the transmission operation is an upshift transmission operation.

When the transmission operation is an upshift transmission operation, the procedure is advanced to step S130, where power-off upshift transmission operation is determined. When it is not an upshift transmission operation, in other words, when the transmission operation is a downshift transmission operation, the procedure is advanced to step S131, where power-on downshift transmission operation is determined.

If the transmission operation is an upshift transmission operation, the reference post-transmission turbine rotation speed is smaller than the turbine rotation speed Nt before the transmission. The turbine rotation speed Nt approaching the reference post-transmission turbine rotation speed shows that the turbine rotation speed Nt is reducing. Therefore, the transmission operation is determined to be a power-off transmission operation.

Moreover, in a downshift transmission operation, the reference post-transmission turbine rotation speed becomes greater than the turbine rotation speed Nt before the transmission. The turbine rotation speed Nt approaching the reference turbine rotation speed shows that the turbine rotation speed Nt is increasing. Therefore, the transmission operation is determined to be a power-on transmission operation.

On the other hand, when it is determined in step S128 that the actual turbine rotation speed Nt is not approximating the reference post-transmission turbine rotation speed, the procedure is advanced to step S132. In step S132, determination is made on whether or not the actual turbine rotation speed Nt is deviating from the reference post-transmission turbine rotation speed.

Actually, based on whether or not the absolute value of the deviation between the actual turbine rotation speed Nt and the reference post-transmission turbine rotation speed is increasing, the determination is made on whether or not the actual turbine rotation speed Nt is deviating from the reference post-transmission operation turbine rotation speed.

When the actual turbine rotation speed Nt is deviating from the reference post-transmission turbine rotation speed, the procedure is advanced to step S133, where determination is made on whether the transmission operation at that time is an upshift transmission operation or not.

When the transmission operation is an upshift transmission operation, the procedure is advanced to step S134, where power-on upshift transmission operation is concluded. When the transmission operation is not an upshift transmission operation, that is, when the transmission operation is a downshift transmission operation, the procedure is advanced to step S135, where power-off downshift transmission operation is concluded.

When the transmission operation is an upshift transmission operation, the reference post-transmission turbine rotation speed is smaller than the turbine rotation speed Nt before the transmission. Therefore, when the turbine rotation speed Nt is deviating from the reference turbine rotation speed, it means that the turbine rotation speed Nt is increasing. As a result, the transmission operation is determined to be a power-on transmission operation.

On the other hand, in a downshift transmission operation, the reference post-transmission operation turbine rotation speed is higher than the turbine rotation speed Nt before the transmission operation. Therefore, when the turbine rotation speed Nt is deviating from the reference turbine rotation speed, it means that the turbine rotation speed Nt is reducing. As a result, the transmission operation is determined to be a power-off transmission operation.

In this stage, determination can be made on whether the transmission operation is a power-on transmission operation or a power-off transmission operation, by comparing the gear ratio of the gear level after the transmission with the gear ratio sequentially computed based on the output shaft rotation speed No and the turbine rotation speed Nt. Such determination process is shown by the flowchart of FIG. 7.

Figure 7:
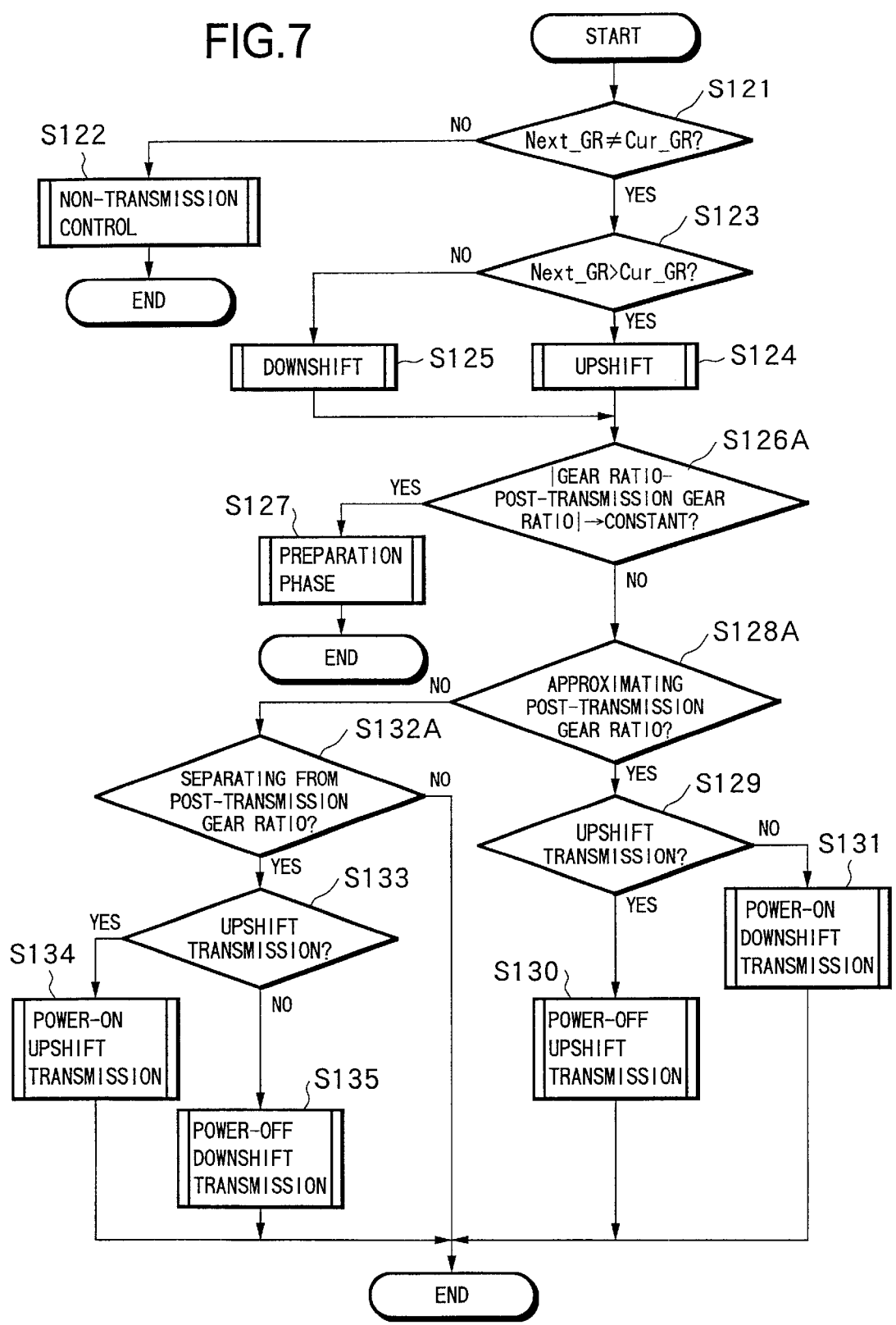
FIG. 7 is a flowchart showing the fourth embodiment of the control determining whether the transmission operation is a power-on transmission operation or a power-off transmission operation.

The flowchart of FIG. 7 is similar to the flowchart of FIG. 6, except for steps S126A, S128A and S132A. These steps are mainly explained hereinafter.

In step S126A, determination is made on whether the deviation between the gear ratio of the gear level after the transmission (post-transmission gear ratio) and the gear ratio sequentially computed based on the output shaft rotation speed No and the turbine rotation speed Nt is constant (fixed), and that the gear ratio is not changed to either the direction approaching the post-transmission gear ratio or deviating therefrom.

When the gear ratio is changed neither to the direction approaching the post-transmission gear ratio nor deviating therefrom, the procedure is advanced to step S127, where a preparation phase process is performed.

On the other hand, when the gear ratio is changed along with the change of the turbine rotation speed Nt during the preparation phase process, the procedure is advanced to step S128A, where determination is made on whether the gear ratio is approximating the post-transmission gear ratio or not.

Actually, based on whether or not the absolute value of the deviation between the gear ratio at that time and the post-transmission gear ratio is reducing, determination is made on whether or not the actual gear ratio is approximating the post-transmission gear ratio.

If the actual gear ratio is approximating the post-transmission gear ratio, the procedure is advanced to step S129, where determination is made on whether or not the transmission operation at that time is an upshift transmission operation or not.

When the transmission operation is an upshift transmission operation, the procedure is advanced to step S130, where power-off upshift transmission operation is concluded. When the transmission operation is not an upshift transmission operation, that is, when it is a downshift transmission operation, the procedure is advanced to step S131, where power-on downshift transmission operation is concluded.

When the transmission operation is an upshift transmission operation, the gear ratio after the transmission operation should be lower than the gear ratio before the transmission operation. When the gear ratio is approximating the post-transmission gear ratio, it means that the turbine rotation speed Nt is reducing, and therefore, the transmission operation is concluded to be a power-off transmission operation.

Moreover, in a downshift transmission operation, the gear ratio after the transmission operation becomes higher than the gear ratio before the transmission operation. When the gear ratio is approximating the post-transmission gear ratio, it means that the turbine rotation speed Nt-is increasing, and therefore, the transmission operation is concluded to be a power-on transmission operation.

On the other hand, when it is determined in step S128A that the actual gear ratio is not approximating the post-transmission gear ratio, the procedure is advanced to step S132A, where determination is made on whether or not the actual gear ratio is deviating from the post-transmission gear ratio.

Actually, the determination on whether or not the actual gear ratio is deviating from the post-transmission gear ratio is based on whether or not the absolute value of the deviation between the actual gear ratio and the post-transmission gear ratio is increasing.

When the actual gear ratio is deviating from the post-transmission gear ratio, the procedure is advanced to step S133, where determination is made on whether or not the transmission operation at that time is an upshift transmission operation.

When the transmission operation is an upshift transmission operation, the procedure is advanced to step S134, where power-on upshift transmission operation is concluded. When the transmission operation is not an upshift transmission operation, or in other words, when it is a downshift transmission operation, the procedure is advanced to step S135, where power-off downshift transmission operation is concluded.

In case of upshift transmission operation, the gear ratio after the transmission is smaller than the gear ratio before the transmission. Therefore, when the gear ratio is deviating from the post-transmission gear ratio, the turbine rotation speed Nt is increasing. Accordingly, the transmission operation is determined to be a power-on transmission operation.

Moreover, in the case of downshift transmission operation, the gear ratio after the transmission is greater than the gear ratio before the transmission. Therefore, when the gear ratio is deviating from the post-transmission gear ratio, the turbine rotation speed Nt is decreasing. Accordingly, the transmission operation is determined to be a power-off transmission operation.

The preparation phase process (steps S7, S127) performed commonly for the upshift/downshift transmission operation and the power-on/power-off transmission operation will be explained as follows.

Figure 8:
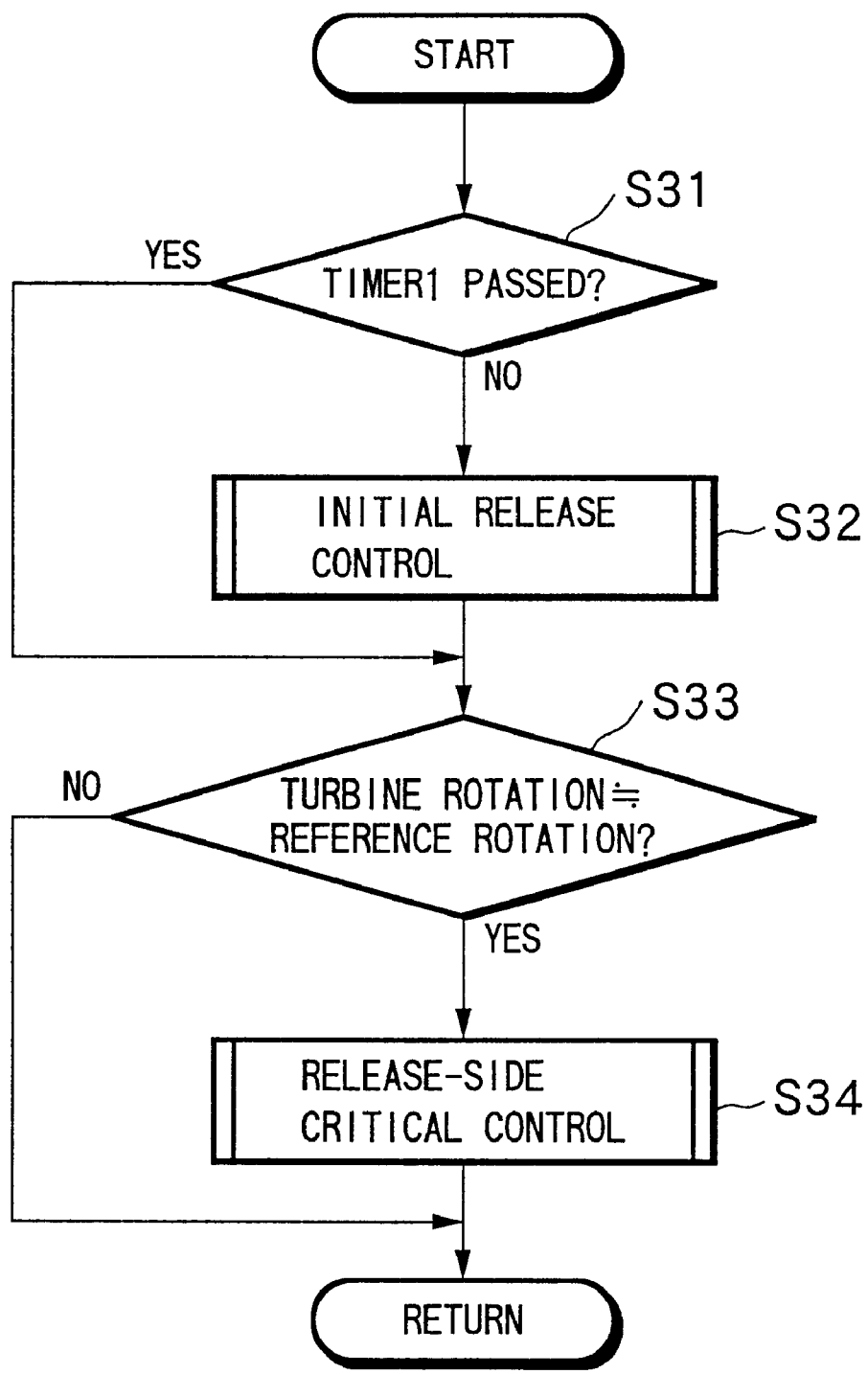
FIG. 8 is a flowchart showing the release-side control during a preparation phase.

The flowchart of FIG. 8 shows the preparation phase process of the release-side friction engagement element. In step S31, determination is made on whether or not a predetermined time TIMER1 has passed or not after the judgement for transmission operation.

When the time is within the predetermined time TIMER1, the procedure is advanced to step S32, where initial release control is performed.

Figure 20:
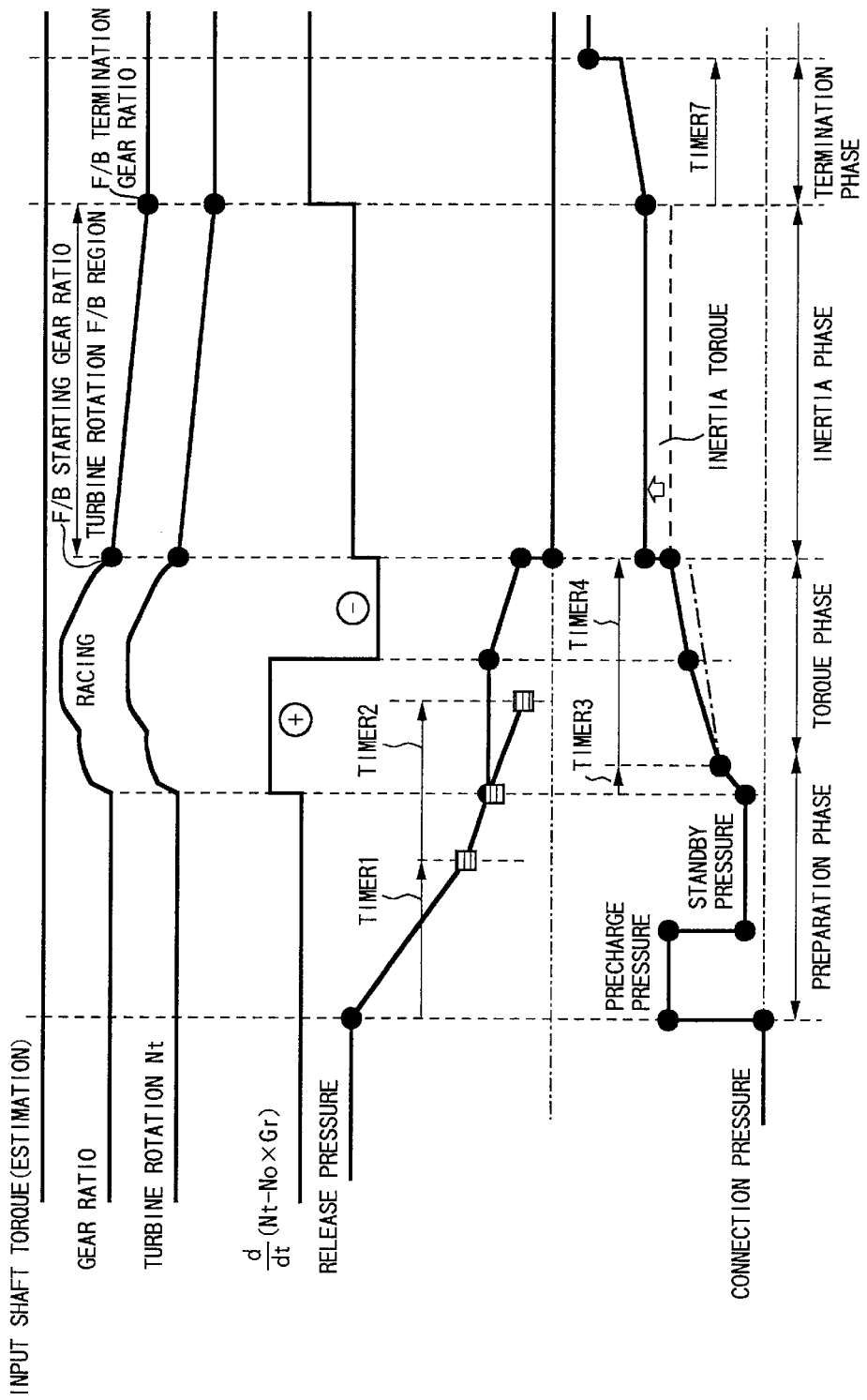
FIG. 20 is a time chart showing the details of the transmission operation control of the power-on upshift transmission operation.

The initial release control is for reducing the hydraulic pressure from the pressure at no transmission operation to the release initial pressure (>critical pressure) within the predetermined time TIMER1 (refer to FIG. 20).

According to the present embodiment, the indication pressure of each friction engagement element can be calculated by converting a transmission operation torque capacity into hydraulic pressure. The transmitted torque capacity is obtained by adding a predetermined allowance margin to a critical torque capacity computed from the estimated input shaft torque value of the transmission mechanism and the release critical torque ratio for obtaining the critical transmission operation torque capacity in which the release-side friction engagement element begins to slide. The release initial pressure is computed based on a predetermined allowance margin.

When the pressure is reduced to the release initial pressure within the predetermined time TIMER1, the procedure is advanced to step S33. During step S33, while it is determined that the turbine rotation speed Nt substantially corresponds to the reference turbine rotation speed (output shaft rotation speed No×pre-transmission gear ratio), the release-side critical control of step S34 is performed.

The judgement performed at step S33 corresponds to the process of step S6, and can be replaced with the process contents of steps S6A, S126 and S126A.

The release-side critical control of step S34 is for lowering the hydraulic pressure from the release initial pressure to the transmission operation torque capacity (smaller than the critical torque capacity) within a predetermined time TIMER2. The pressure is gradually reduced from the release initial pressure to the target pressure (<critical pressure) computed with the allowance margin being minus (meaning that when the allowance margin is provided as a correction coefficient, the correction coefficient is set to a value equal to or below 1), within the predetermined time TIMER2 (refer to FIG. 20).

When the release-side engagement hydraulic pressure is gradually reduced during the release-side critical control, the fact that release-side transmission operation torque capacity is reduced to a value close to the critical value can be indirectly recognized by the turbine rotation speed Nt being changed and no longer corresponding to the reference turbine rotation speed (No×pre-transmission gear ratio) when the pressure approximates the critical torque capacity. Based on the direction of change of the turbine rotation speed Nt at that time, the transmission operation can be distinguished to either the power-on transmission operation or the power-off transmission operation.

Figure 9:
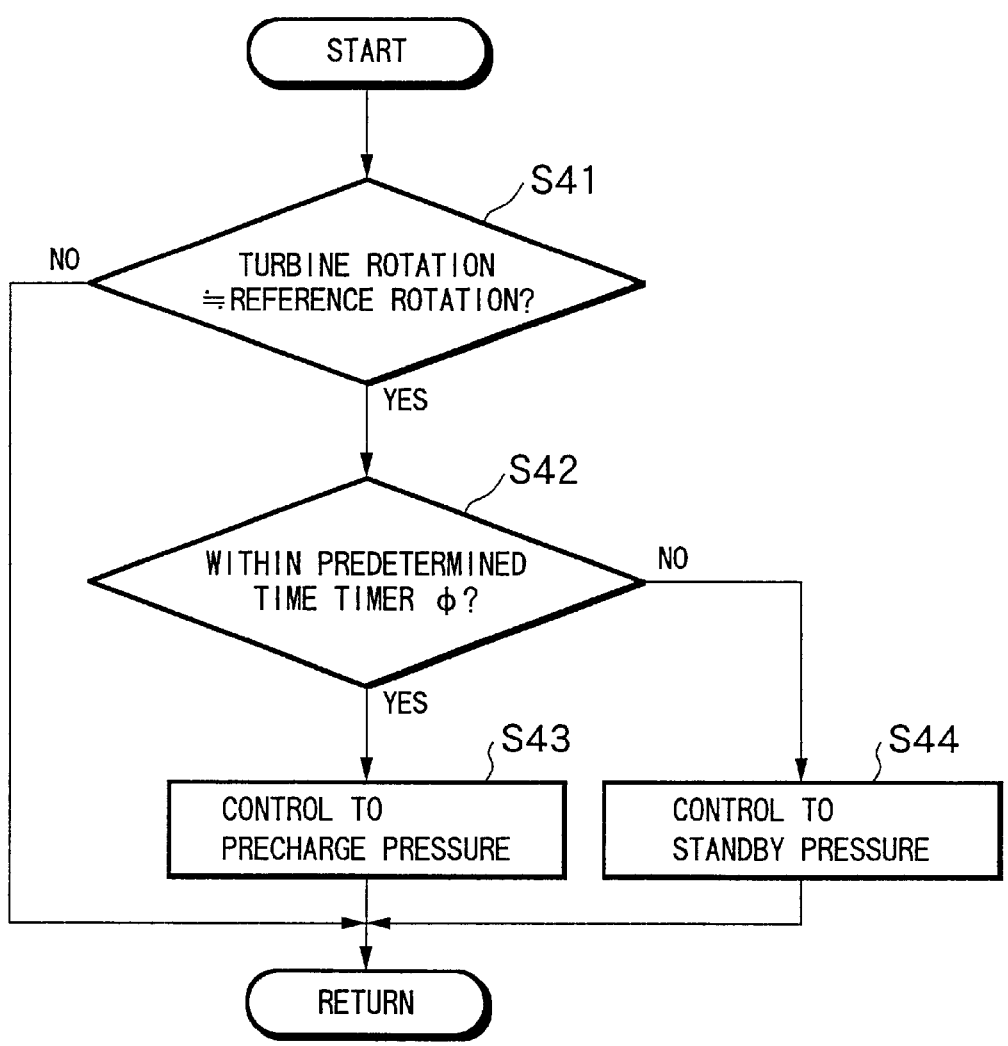
FIG. 9 is a flowchart showing the connection-side control during the preparation phase.

On the other hand, the connection-side preparation phase process is shown in the flowchart of FIG. 9.

The flowchart of FIG. 9 shows the connection-side preparation phase process. In step S41, determination is made on whether or not the turbine rotation speed Nt substantially correspond to the reference turbine rotation speed (output shaft rotation speed No×pre-transmission gear ratio), and if they substantially correspond, the procedure is advanced to step S42.

Moreover, the judgement performed at step S41 corresponds to the process of step S6, and therefore, can be replaced with the process contents of steps S6A, S126 and S126A.

In step S42, determination is made on whether or not the time is within a predetermined time TIMER0 from the transmission operation judgement. When the time is within the predetermined time TIMER0, the procedure is advanced to step S43, where the engagement hydraulic pressure of the connection-side friction engagement element is increased by steps to a predetermined precharge pressure. The precharge pressure is maintained during the predetermined time TIMER0.

When the predetermined time TIMER0 has passed, the procedure is advanced to step S44, where the connection hydraulic pressure of the connection-side friction engagement element is reduced by steps to a standby pressure, which is smaller than the precharge pressure. The standby pressure is then maintained.

Next, the details related to the transmission operation control based on the result of the power-on/power-off transmission operation determination following the preparation phase process, in other words, the detailed contents of steps S9 and S11, will be explained with reference to the flowchart of FIG. 10.

Figure 10:
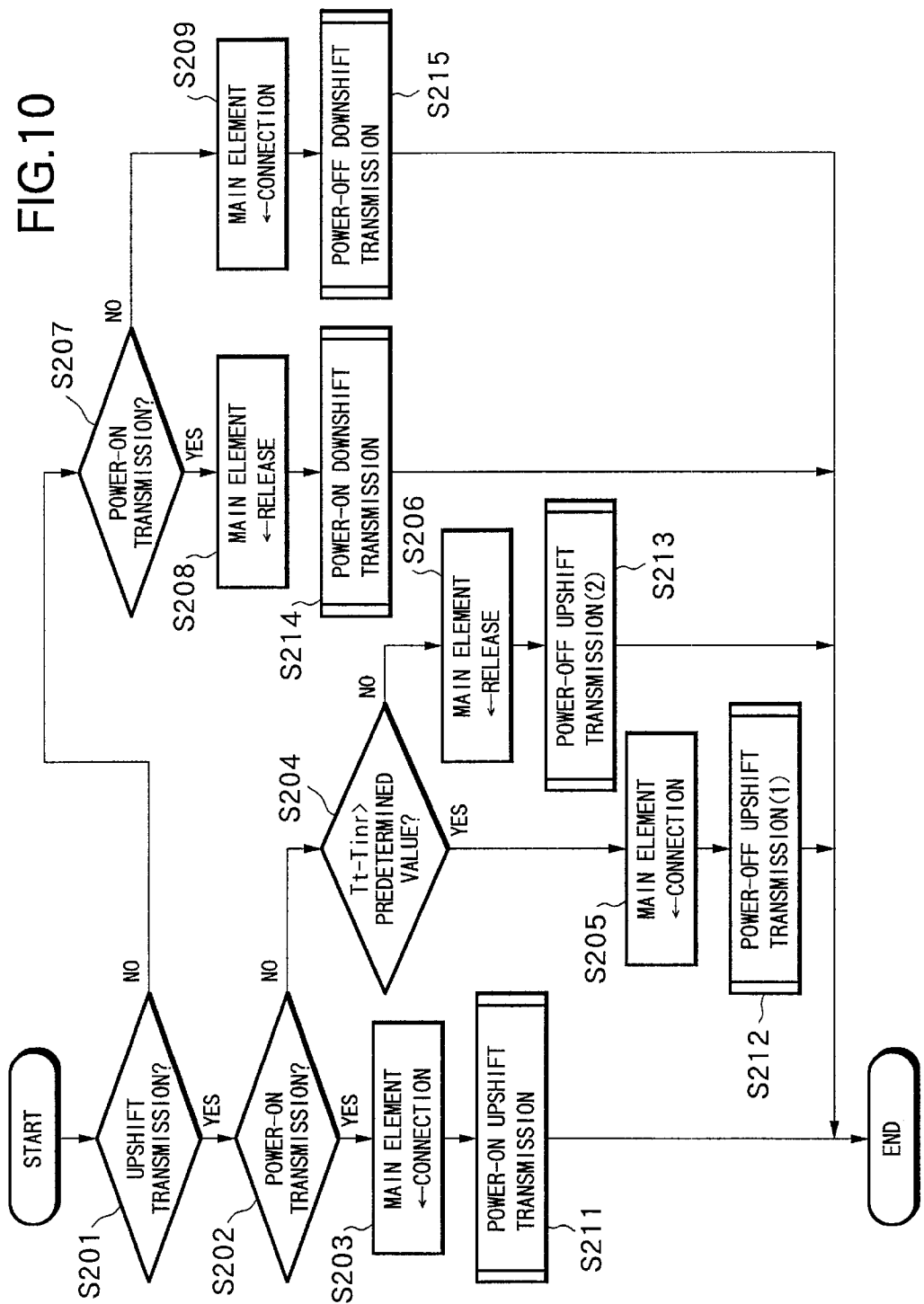
FIG. 10 is a flowchart showing the determination of the main connection element based on whether the transmission operation is a power-on transmission operation or a power-off transmission operation.

The process shown by the flowchart of FIG. 10 corresponds to the transmission operation process selecting device and selecting means, and the transmission operation control device and control means.

According to the flowchart of FIG. 10, the main control element for performing the transmission operation (either the release side or the connect side) is determined based on whether the transmission operation is a power-on upshift transmission operation, a power-off upshift transmission operation, a power-on downshift transmission operation or a power-off downshift transmission operation.

In step S201, determination is made on whether or not the transmission operation is an upshift transmission operation. When the transmission operation is determined to be an upshift, the procedure is advanced to step S202.

In step S202, determination is made on whether or not the transmission operation is a power-on transmission operation. When the transmission operation is determined to be a power-on upshift transmission operation, the procedure is advanced to step S203. In step S203, the connection-side friction engagement element is selected as the main control element, and the-gear ratio is set to be changed to a gear ratio of the post-transmission gear level by controlling the engagement hydraulic pressure of the connection-side friction engagement element.

If the transmission operation is not a power-on upshift transmission operation, or when the transmission operation is a power-off upshift transmission operation, the procedure is advanced to step S204. In this step, determination is made on whether or not the value obtained by subtracting the inertia torque Tinr caused by the transmission operation (decreasing of rotation) from the estimated value of input shaft torque Tt is greater than a predetermined value (threshold value).

Moreover, the inertia torque Tinr is stored in advance in a memory as a table value corresponding to a target transmission operation time. The determination of Tt−Tinr>predetermined value is, in other words, determining whether or not the estimated value of input shaft torque Tt is greater than the inertia torque Tinr+predetermined value (threshold value).

If Tt−Tinr is greater than the predetermined value, or in other words, when the transmission operation torque capacity during transmission operation is determined to be great, the procedure is advanced to step S205. In this step, similar to the power-on transmission operation, the connection-side friction engagement element is selected as the main control element.

On the other hand, when Tt−Tinr is smaller than a predetermined value, the procedure is advanced to step S206, where the release-side friction engagement element is selected as the main control element. By controlling the engagement pressure of the release-side friction engagement element, the gear ratio is changed to the gear ratio of the post-transmission gear level.

Moreover, when it is determined in step S201 that the transmission operation is a downshift transmission operation instead of an upshift transmission operation, the procedure is advanced to step S207.

In step S207, determination is made on whether or not the transmission operation is a power-on downshift transmission operation. When the transmission operation is a power-on downshift transmission operation, the procedure is advanced to step S208, where the release-side friction engagement element is selected as the main control element. When the transmission operation is not a power-on downshift transmission operation, in other words, when it is a power-off downshift transmission operation, the procedure is advanced to step S209, where the connection-side friction engagement element is selected as the main control element.

Subsequent to steps S203, S205, S206, S208 and S209 where the main control elements are determined, in steps S211 through S215, a transmission operation control (inertia phase or torque phase) is performed continuously to the preparation phase. Here, the power-on upshift transmission operation (step S211) utilizing the connection-side friction engagement element as the main control element is explained according to the flowchart of FIG. 11 with reference to the time chart of FIG. 20.

As for the power-off upshift transmission operation with Tt−Tinr being greater than the predetermined value (hereinafter called power-off upshift transmission operation (1)), and the power-off downshift transmission operation, selecting the connection-side element as the main control element similar to the power-on upshift transmission operation, the basic controls are common to the power-on upshift transmission operation. The only difference is the process related to corresponding to the difference in the direction of rotation change based on the starting of release of the release-side friction engagement element.

Figure 21:
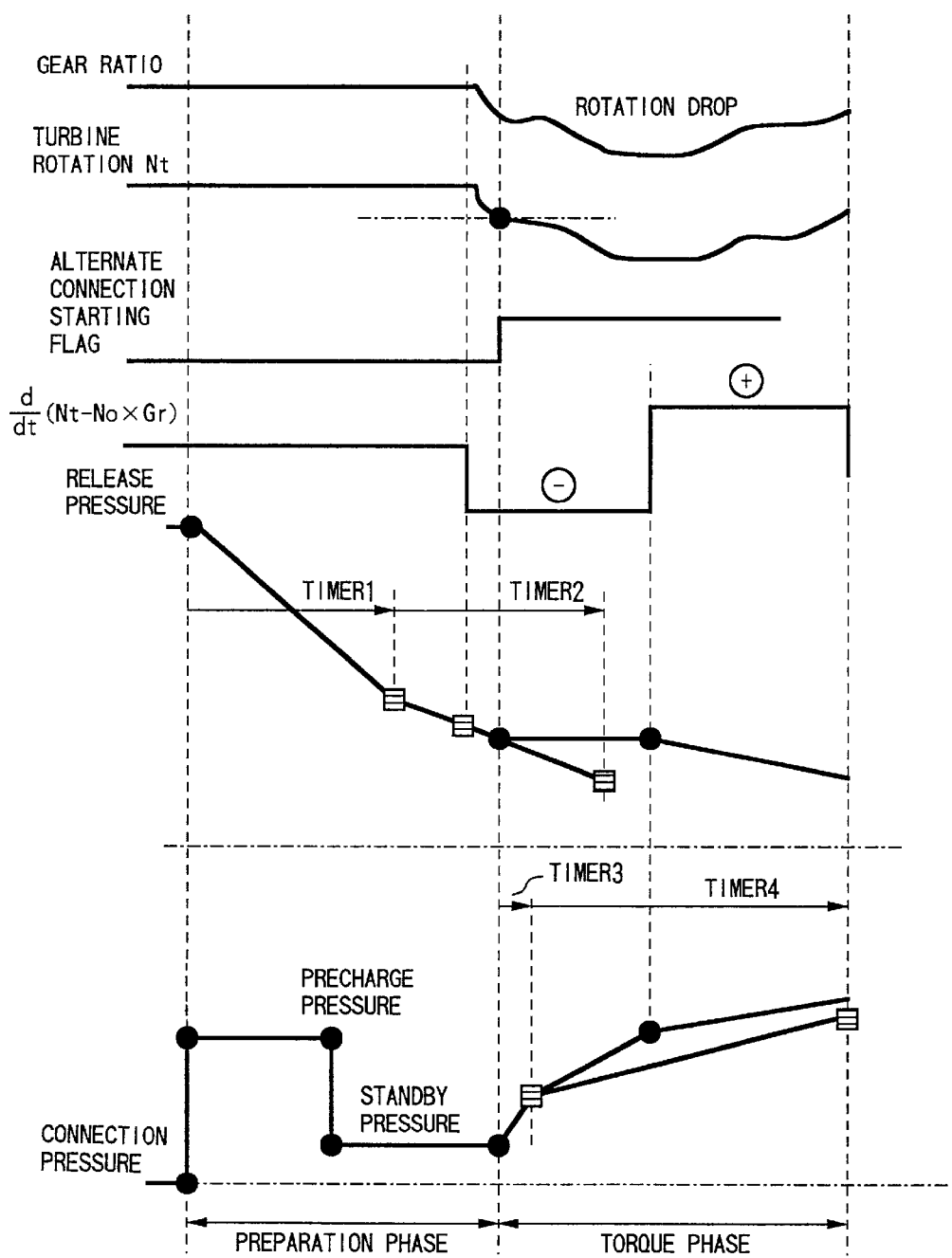
FIG. 21 is a time chart showing the preparation phase and the torque phase of the transmission operation control of the power-off downshift transmission operation.

FIG. 21 shows the characteristics of change of turbine rotation and the characteristics of hydraulic pressure control in the torque phase during the power-off downshift transmission operation.

As for the power-off downshift transmission operation and the power-off upshift transmission operation (1) (steps S215 and S212), explanations of individual processes are omitted. Instead, the differences in procedure related to these transmission operations are explained during the following explanation on the power-on upshift transmission operation (step S211).

Figure 11:
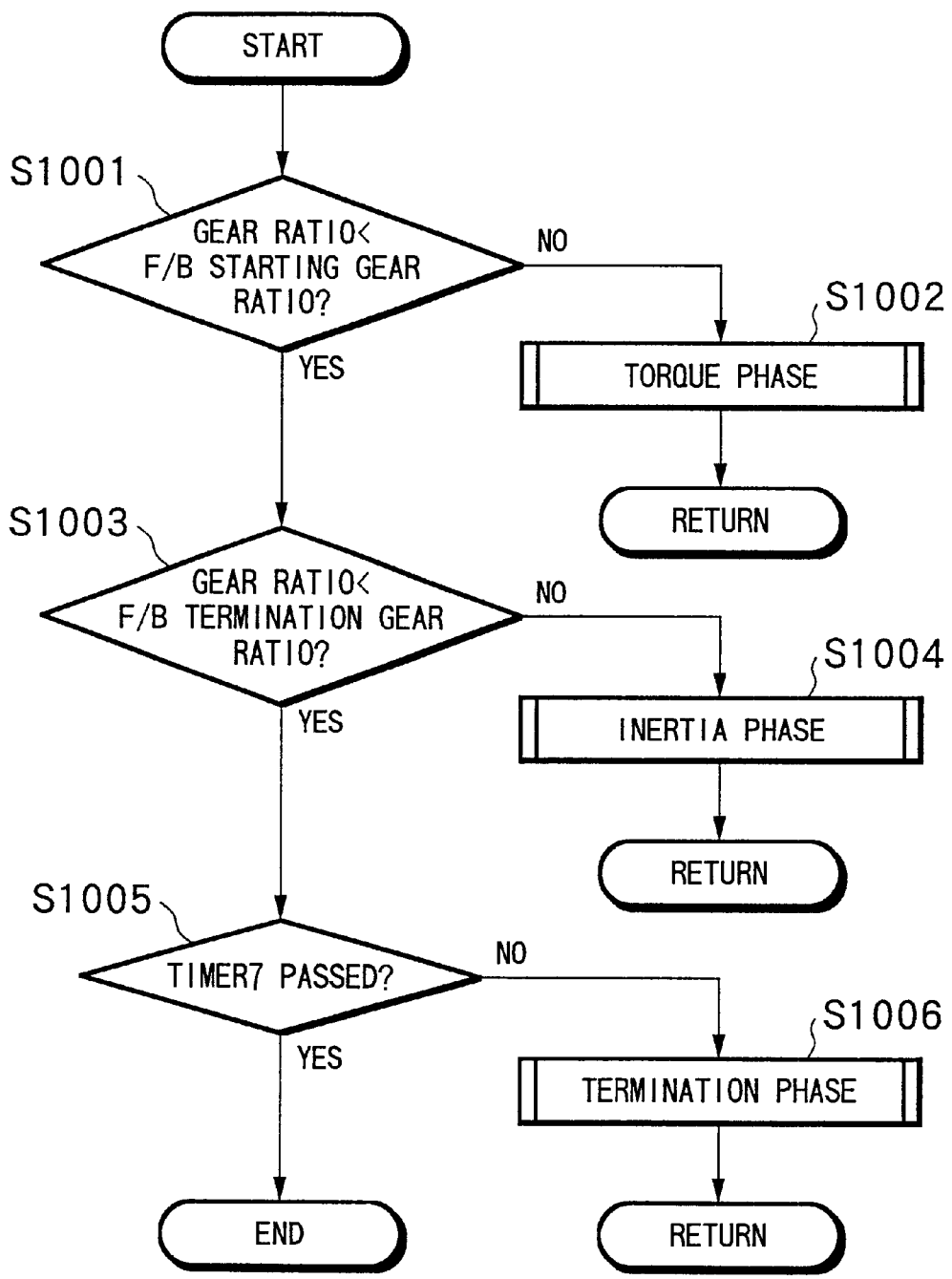
FIG. 11 is a flowchart showing-the transmission operation control after the preparation phase process of the power-on upshift transmission operation.

The flowchart of FIG. 11 shows the outline of the transmission operation control (step S211) during power-on upshift transmission operation. After the turbine rotation speed Nt has changed accompanying the preparation phase process, it is determined in step S1001 whether or not the gear ratio has changed to a feedback (F/B.) starting gear ratio set in advance. During the time the gear ratio changes to the F/B starting gear ratio, the procedure is advanced to step S1002, where torque phase process is performed.

When the gear ratio has reached the F/B starting gear ratio, the procedure is advanced to step S1003, where determination is made on whether or not the gear ratio has reached a feedback (F/B) terminating gear ratio set in advance. Until the gear ratio reaches the F/B terminating gear ratio, the procedure advances to step S1004, where inertia phase process is performed.

When the gear ratio has reached the F/B terminating gear ratio, the procedure is advanced to step S1005, where determination is made on whether or not a predetermined time TIMER7 has passed after the termination of the inertia phase. When the time is within the predetermined time TIMER7, the procedure is advanced to step S1006, where termination phase process is performed, and after the predetermined time TIMER7 has passed, the transmission operation control is terminated.

Figure 12:
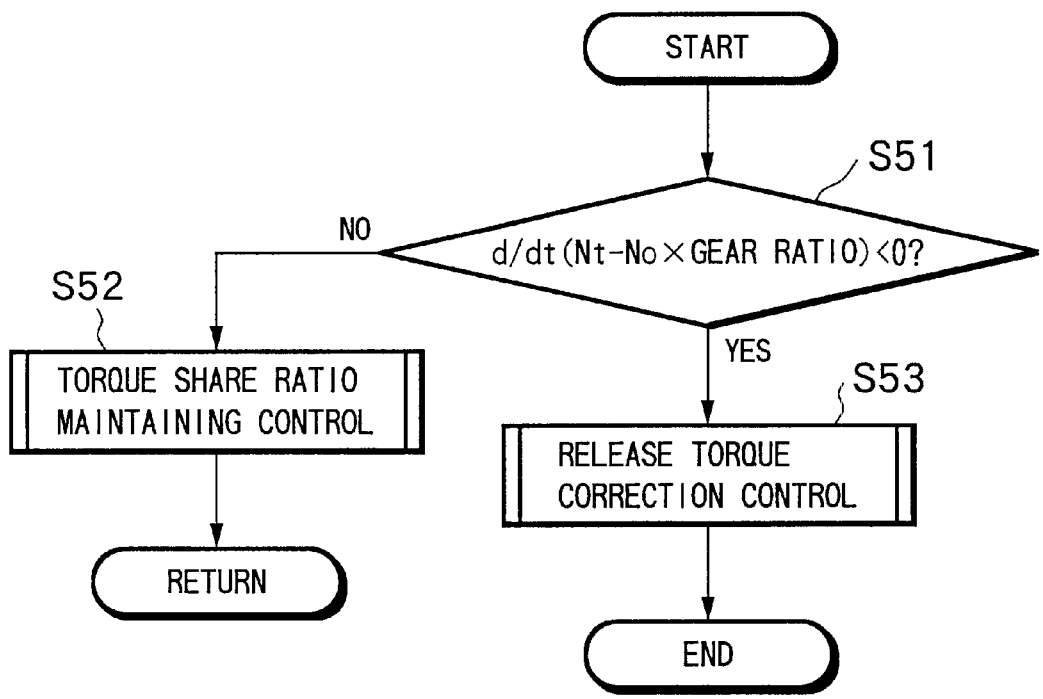
FIG. 12 is a flowchart showing the release-side control during the torque phase process of the power-on upshift transmission operation.

The flowchart of FIG. 12 shows the release-side control in the torque phase process (step S1002). In step S51, determination is made on whether or not the time differential value of the deviation between the turbine rotation speed Nt and the reference turbine rotation speed (No×pre-transmission gear ratio) is negative.

At this stage, the variation speed of the turbine rotation speed Nt may be determined indirectly by calculating the gear ratio based on the output shaft rotation speed and the turbine rotation speed Nt, computing the variation speed (time differential value) of the gear ratio, and detecting the variation speed of the gear ratio instead of the variation speed of the turbine rotation speed Nt.

While d/dt (Nt−No×pre-transmission gear ratio)□0, in other words, when the deviation between the turbine rotation speed Nt and the reference turbine rotation (No×pre-transmission gear ratio) is increasing (while the input shaft rotation speed is increasing), the procedure is advanced to step S52, where torque share ratio maintaining control is performed.

The torque share ratio maintaining control refers to maintaining the allowance margin when the release-side friction engagement element is at a critical state, and according to the input shaft torque at that time, computing the engagement hydraulic pressure for the release-side friction engagement element.

During the power-on upshift transmission operation, the turbine rotation speed Nt is increased (raced) due to the release-side friction engagement element being in a critical state. While d/dt (Nt−No×pre-transmission gear ratio)□0, the change in rotation accompanied by the starting of release has not yet converged. Therefore, the release-side element is maintained at the critical state so as to restrain further increase of rotation.

On the other hand, when it is determined during step S51 that d/dt (Nt−No×pre-transmission gear ratio)<0 (the input shaft rotation speed is reducing), the procedure is advanced to step S53, where release torque correction control is performed.

The release torque correction control is for setting the correction torque of the input shaft torque used for computing the hydraulic pressure according to the value of d/dt (Nt−No×pre-transmission gear ratio). The greater the reducing speed of the turbine rotation speed Nt is, the greater the input shaft torque is corrected to be reduced, and thereby, the transmission operation torque capacity of the release-side friction engagement element is reduced.

This is because if the connection control of the connection-side friction engagement element is proceeded concurrent to the release of the release-side friction engagement element, and when the release-side element is maintained at the critical state, the rotation will reduce suddenly. In order to prevent such sudden drop of rotation, release is promoted.

When the gear ratio is changed toward the upshift direction exceeding the F/B starting gear ratio, the hydraulic pressure of the release-side element is varied in steps from the release pressure at that time to pressure=0.

As for the power-off downshift transmission operation and the power-off upshift transmission operation (1), rotation drop is observed when release is started. Therefore, while d/dt (Nt−No×pre-transmission gear ratio) is negative, the release-side element is maintained at critical pressure. On the other hand, when d/dt (Nt−No×pre-transmission (gear-ratio) is positive, the correction torque is set to a greater absolute negative value as the absolute value of d/dt increases. Thereby, the release-side hydraulic pressure is gradually reduced according to the recovery of rotation accompanying the advancement of the connection control procedure.

Figure 13:
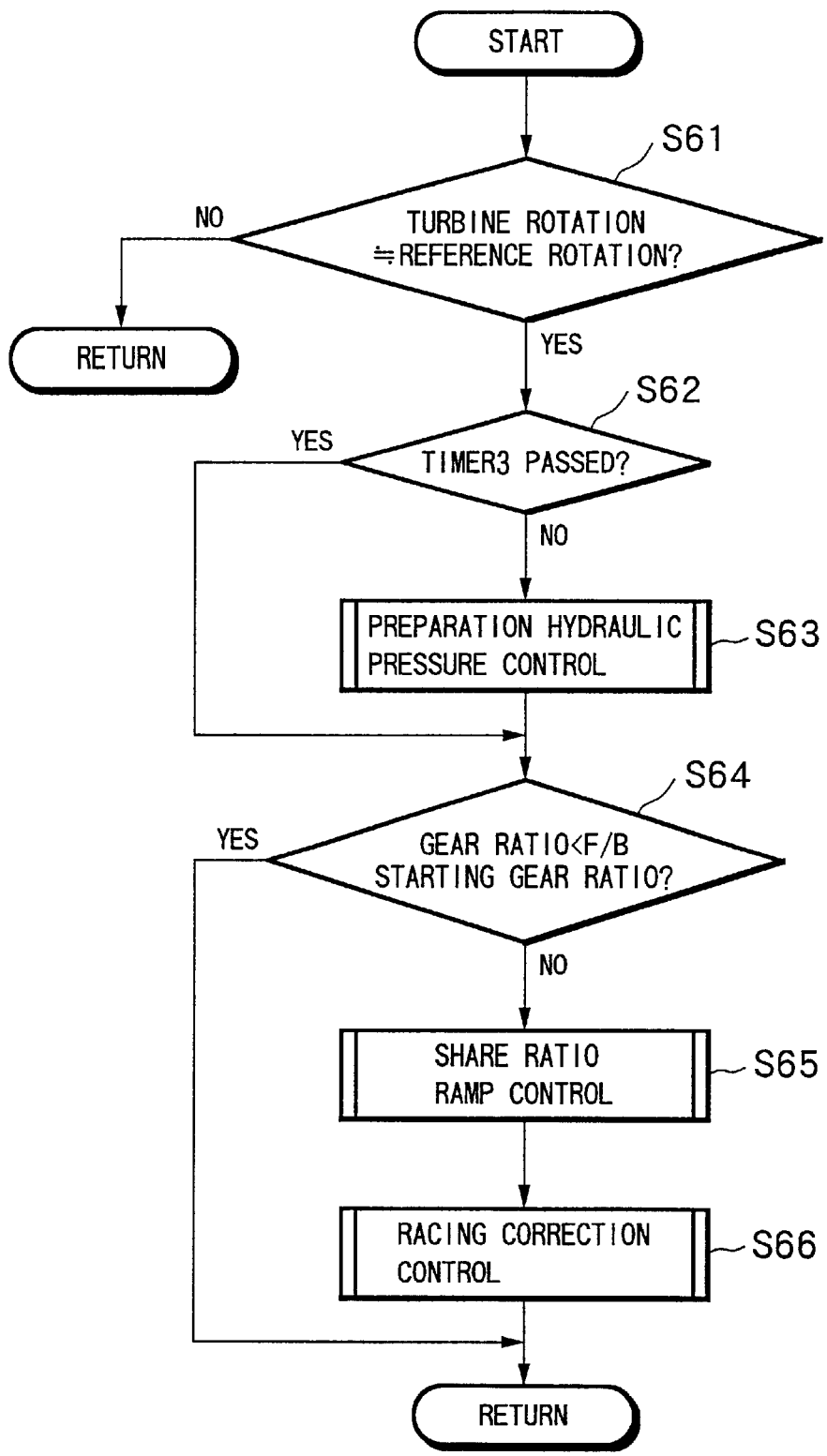
FIG. 13 is a flowchart showing the connection-side control during the torque phase process of the power-on upshift transmission operation.

On the other hand, the torque phase process of the connection side during the power-on upshift transmission operation (step S1002) is performed as shown in the flowchart of FIG. 13.

In step S61, determination is made on whether or not the reference turbine rotation speed (No×pre-transmission gear ratio) and the turbine rotation speed Nt substantially correspond. When, accompanied by the starting of release of the release-side friction engagement element, the turbine rotation speed Nt begins to change, and no longer corresponds to the reference turbine rotation speed, the procedure is advanced to step S62.

In step S62, determination is made on whether or not a predetermined time TIMER3 has passed after the change of turbine rotation speed Nt (starting of release) is judged.

When it is determined that the time is within the predetermined time TIMER3, the procedure is advanced to step S63, where preparation pressure control is performed to the connection side.

The preparation pressure control is for increasing the indication pressure of the connection-side friction engagement element within the predetermined time TIMER3 from a standby pressure to a connecting initial pressure. The connecting initial pressure is computed from the input shaft torque and the allowance margin set in advance, so that the capacity thereof is smaller than the critical torque capacity.

When it is determined that predetermined time TIMER3 has passed in step S62, the procedure is advanced to step S64.

In step S64, determination is made on whether or not the gear ratio becomes smaller than the F/B starting gear ratio. When the gear ratio is greater than the F/B starting gear ratio, the procedure is advanced to step S65, where a share ratio ramp control is performed.

The share ratio ramp control is for increasing the hydraulic pressure of the connection-side friction engagement element from a value smaller than a pressure corresponding to the critical torque capacity to a pressure corresponding to a torque capacity exceeding the critical torque capacity by a fixed speed.

After the share ratio ramp control, the racing correction control is performed in step S66.

The racing correction control is for restraining the racing tending to occur with the starting of release by promoting connection. When d/dt (Nt−No×gear ratio) is positive, the greater the value of d/dt is, the greater positive value the correction value of the input shaft torque utilized for computing hydraulic pressure is set to. The racing is restrained by promoting the connection based on a hydraulic pressure set to correspond to an input shaft torque that is greater than the actual value.

Oppositely, as for the power-off downshift transmission operation and the power-off upshift transmission operation (1), rotation drop tends to occur, and such rotation drop may be restrained by promoting the connection control. Therefore, when d/dt (Nt−No×gear ratio) is negative, the correction torque is set so that when the absolute value of d/dt increases, the correction torque becomes a greater positive value.

Next, the inertia phase process of step S1004 according to the flowchart of FIG. 11 will be explained.

The inertia phase process for the release side is performed by maintaining, during the inertia phase, the hydraulic pressure to a level in which the torque phase has terminated (hydraulic pressure=0).

Figure 14:
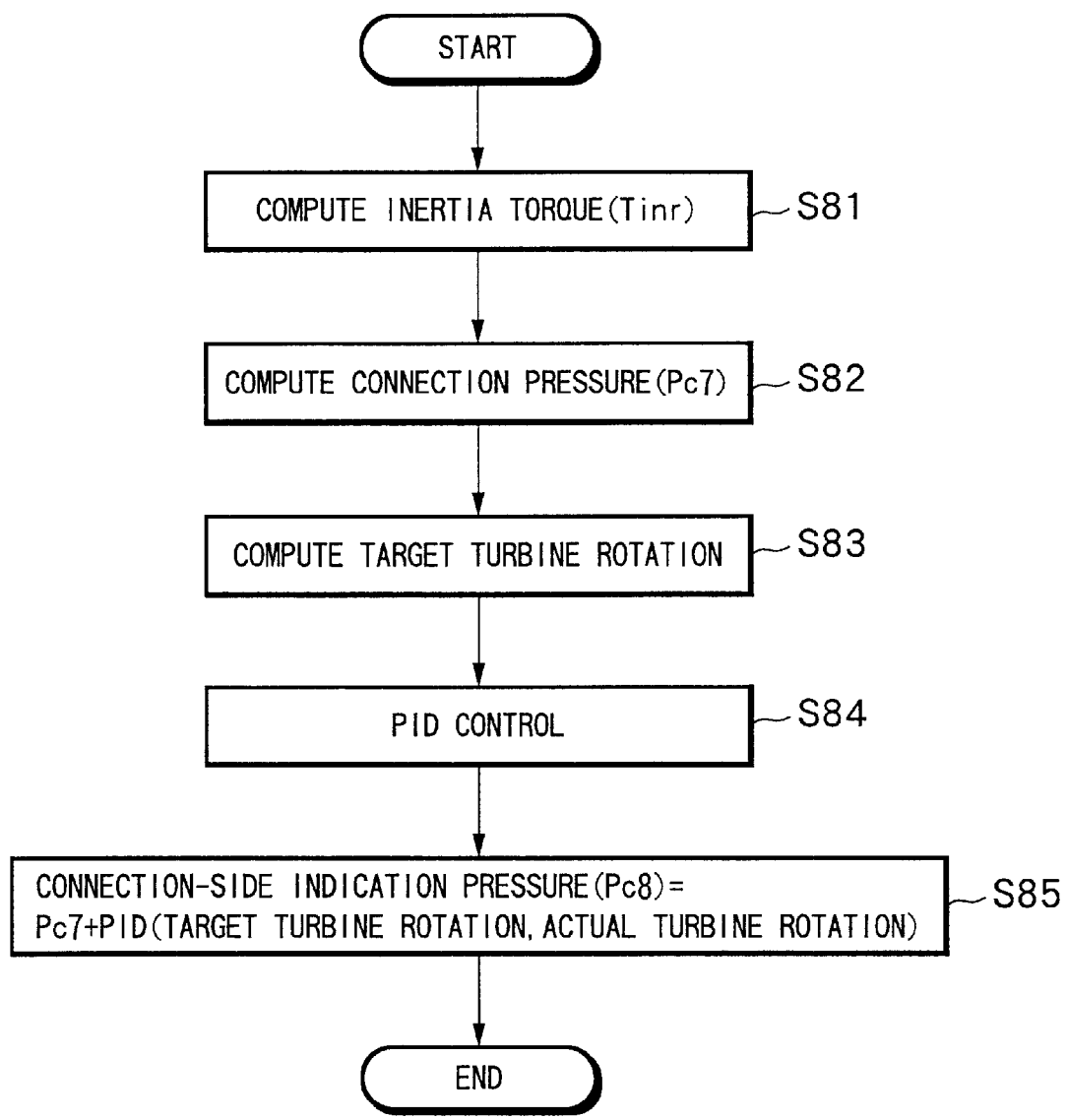
FIG. 14 is a flowchart showing the connection-side control during the inertia phase process of the power-on upshift transmission operation.

The inertia phase process for the connection side is shown in the flowchart of FIG. 14.

According to the flowchart of FIG. 14, step S81 is for computing the inertia torque Tinr. The inertia torque Tinr (transmission operation torque) is stored in the memory in advance as a table value corresponding to the target transmission operation time, in which the inertia torque is set to a greater value as the target transmission operation time reduces.

In step S82, the hydraulic pressure corresponding to the inertia torque Tinr is added to the hydraulic pressure corresponding to the critical torque capacity computed according to the input shaft torque. This is set as the basic pressure Pc7.

As for the power-off downshift transmission operation, the inertia torque Tinr becomes the torque to be used for increasing the rotation speed. Therefore, the hydraulic pressure corresponding to the critical torque capacity according to the input shaft torque is corrected to a smaller value by a pressure corresponding to the inertia torque Tinr.

In step S83, the target turbine rotation speed is calculated. The target turbine rotation speed is obtained by multiplying the output shaft rotation speed No to the target gear ratio from moment to moment, assuming that the gear ratio is varied from the pre-transmission gear ratio to the post-transmission gear ratio by a fixed speed within a target transmission operation time.

In step S84, the proportional-plus-integral-plus-differential control of the feedback correction value PID is performed so that the actual turbine rotation speed corresponds to the target turbine rotation speed. In the next step S85, the indication pressure Pc7 of the basic control is corrected by the feedback correction value PID, in order to set a connection-side indication pressure Pc8.

Thereby, the gear ratio is controlled to the post-transmission gear ratio by controlling the pressure of the connection-side friction engagement element.

When the gear ratio becomes smaller than the F/B termination gear ratio, a termination phase process is performed, if the time is within a predetermined time TIMER7 from the point the gear ratio first dropped below the F/B termination gear ratio.

During the terminal phase process for the release-side friction engagement element, the pressure value at the time the inertia phase is terminated is maintained.

Figure 15:
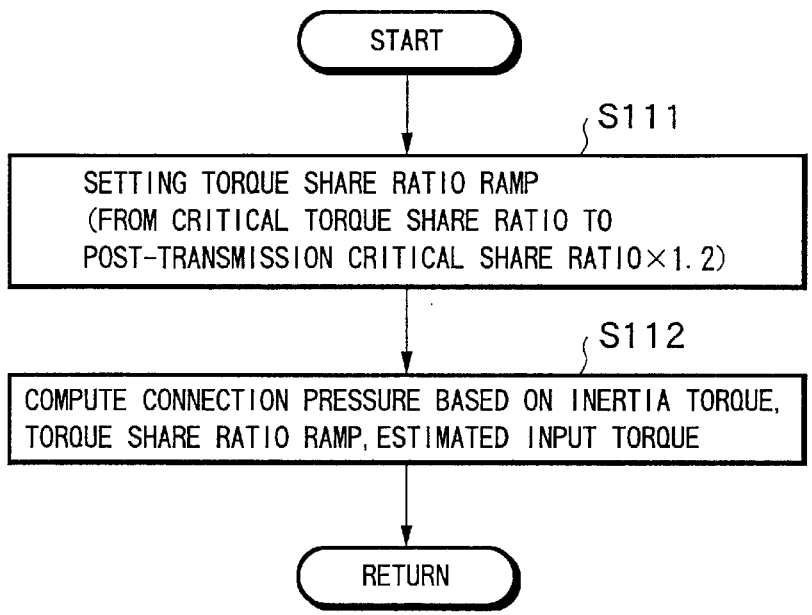
FIG. 15 is a flowchart showing the connection-side control during the termination phase process of the power-on upshift transmission operation.

On the other hand, the termination phase process for the connection-side friction engagement element is shown in the flowchart of FIG. 15. In step S111, the hydraulic gradient is set for increasing the pressure from the critical hydraulic pressure corresponding to the critical torque capacity to a pressure corresponding to a value obtained by multiplying a predetermined value (for example, 1.2) to the critical hydraulic pressure, within the predetermined time TIMER7. In the next step S112, the connection-side pressure is increased according to the hydraulic gradient, and the pressure is increased in steps so that after the predetermined time TIMER7 has passed, the pressure reaches the maximum value.

Figure 22:
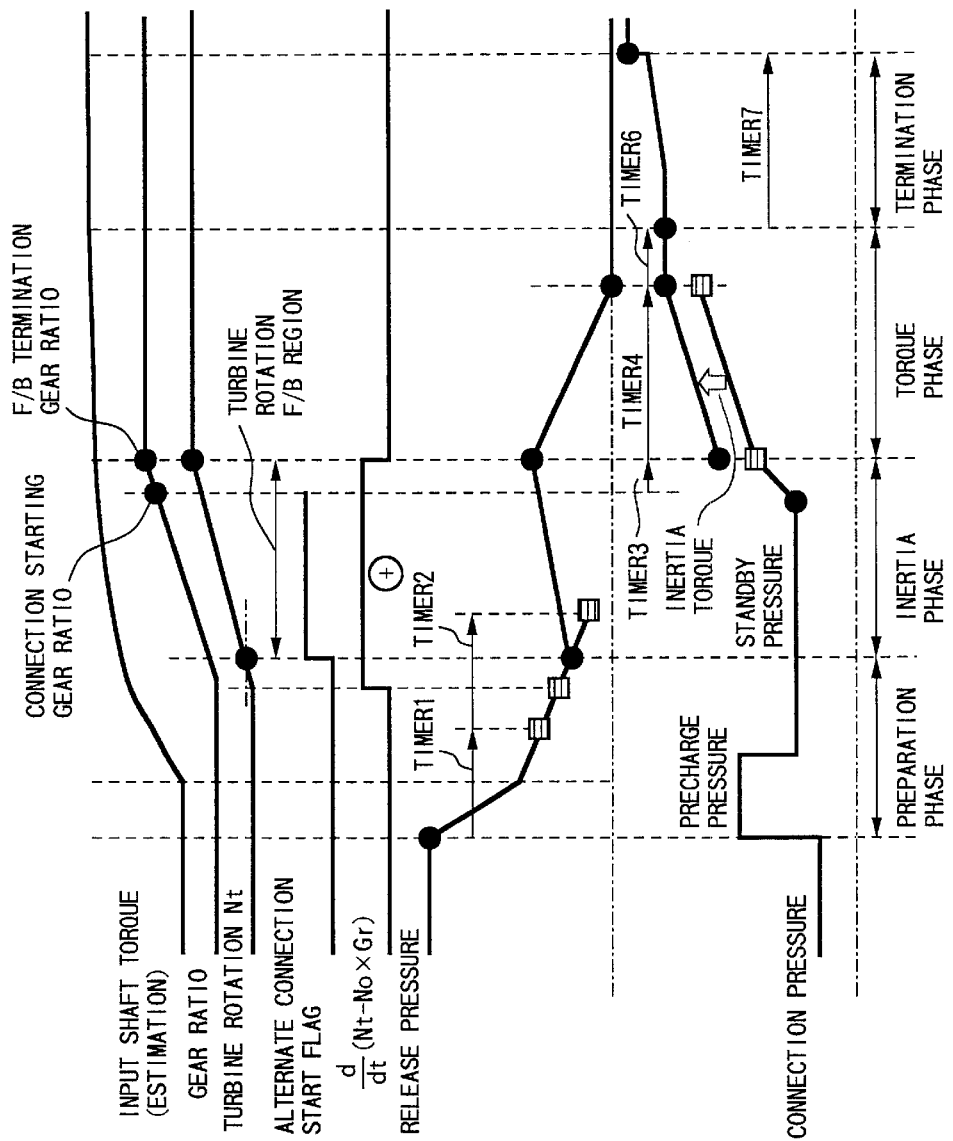
FIG. 22 is a time chart showing the details of the transmission operation control of the power-on downshift transmission operation.

Next, the power-on downshift transmission operation of step S214 in the flowchart of FIG. 10 will now be explained with reference to the time chart of FIG. 22.

Figure 16:
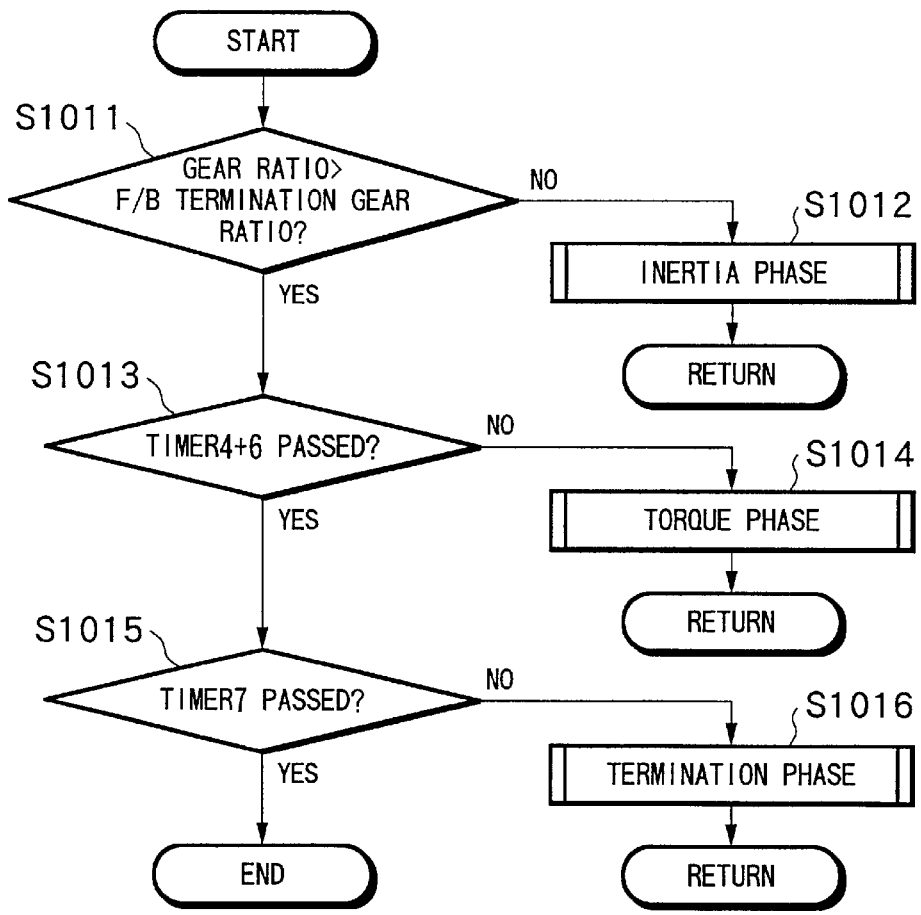
FIG. 16 is a flowchart showing the transmission operation control after the preparation phase process of the power-on downshift transmission operation.

The flowchart of FIG. 16 shows the outline of the transmission operation control during the power-on downshift transmission operation with the release-side element acting as the main control element. In step S1011, determination is made on whether or not the gear ratio has reached the feedback (F/B) termination gear ratio after the turbine rotation speed Nt had changed along with the preparation phase process. While the gear ratio changes to the F/B termination gear ratio, the procedure advances to step S1012, where inertia phase process is performed.

When the gear ratio reaches the F/B termination gear ratio, the procedure is advanced to step S1013, where determination is made on whether or not predetermined time TIMER4+predetermined time TIMER6 has passed after the gear ratio had reached the F/B termination gear ratio. If predetermined time TIMER4+predetermined time TIMER6 has not yet passed, the procedure advances to step S1014, where torque phase process is performed.

After the predetermined time TIMER4+TIMER6 has passed, the procedure is advanced to step S1015, where determination is made on whether or not a predetermined time TIMER7 has passed after the termination of the torque phase process. When it is still within the predetermined time TIMER7, the procedure is advanced to step S1016, where termination phase process is performed. After the predetermined time TIMER7 has passed, the power-on downshift transmission operation is terminated.

Figure 17:
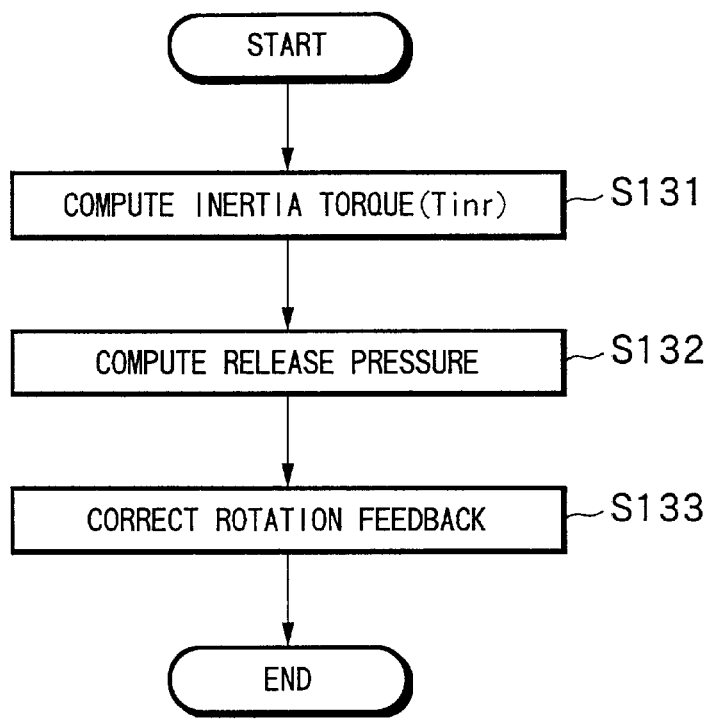
FIG. 17 is a flowchart showing the release-side control during the inertia phase of the power-on downshift transmission operation.

Here, the inertia phase process for the release side during the power-on downshift transmission operation is explained according to the flowchart of FIG. 17.

In step S131, inertia torque (transmission operation torque) Tinr accompanied by the increase of rotation caused by the power-on downshift transmission operation is calculated.

Then, in step S132, the estimated value of the input shaft torque is corrected to a smaller value based on the inertia torque (transmission operation torque) Tinr. Thereby, the hydraulic pressure corresponding to the critical torque capacity is calculated.

Moreover, in step S133, utilizing the hydraulic pressure corresponding to the critical torque capacity as the base value, a turbine rotation feedback control is performed to make the turbine rotation speed Nt correspond to the target turbine rotation speed corresponding to the time that has passed after starting the transmission operation.

Actually, the target gear ratio is set according to the time passed after starting the transmission operation, and based on the target gear ratio and the output shaft rotation speed No, the target turbine rotation speed is computed.

Then, based on the deviation between the actual turbine rotation speed and the target turbine rotation speed, the feedback correction portion is calculated, for example, by a proportional-plus-integral-plus-differential control (PID control), and the basic pressure is corrected by the feedback correction portion.

Figure 18:
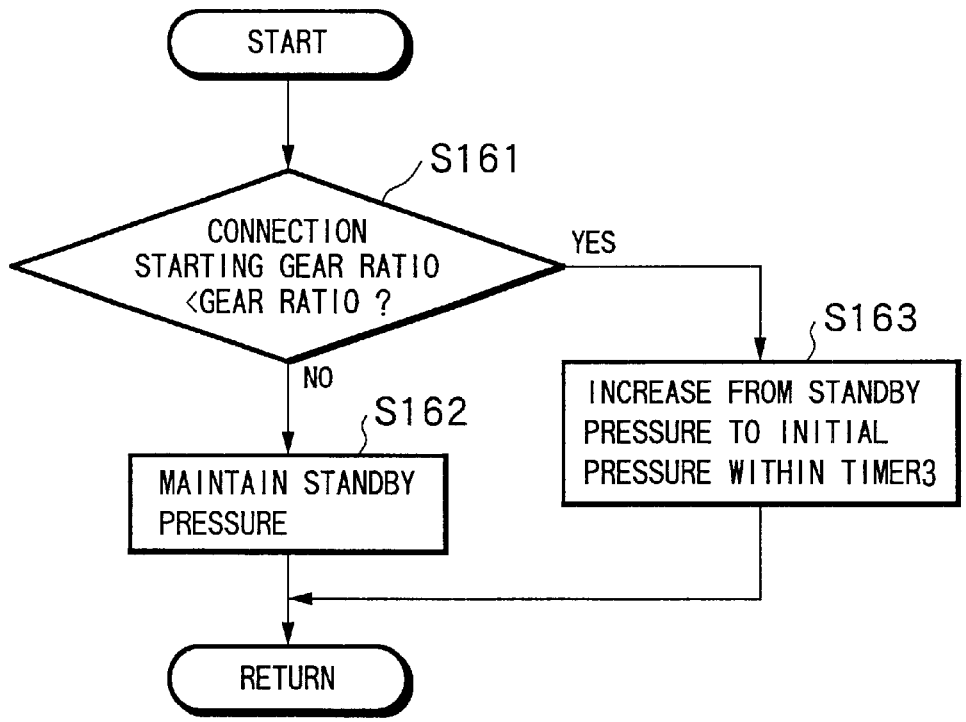
FIG. 18 is a flowchart showing the connection-side control during the inertia phase of the power-on downshift transmission operation.

On the other hand, the inertia phase process for the connection side is shown by the flowchart of FIG. 18.

In step S161, determination is made on whether or not the gear ratio has reached a connection-starting gear ratio set in advance. Until the gear ratio reaches the connection-starting gear ratio, the procedure is advanced to step S162, where the pressure is maintained at a standby pressure.

When the gear ratio reaches the connection-starting gear ratio, the procedure is advanced to step S163, where a preparation pressure control is performed.

The preparation pressure control, which is similar to the preparation pressure control for the power-on upshift transmission operation, is a process for increasing the pressure from the standby pressure to the connection initial pressure within a predetermined time TIMER3. The connection initial pressure is set based on the predetermined allowance margin (1) and the input shaft torque.

The torque phase process for the release side executes a ramp control for reducing the release-side pressure to 0 within a predetermined time TIMER4.

Figure 19:
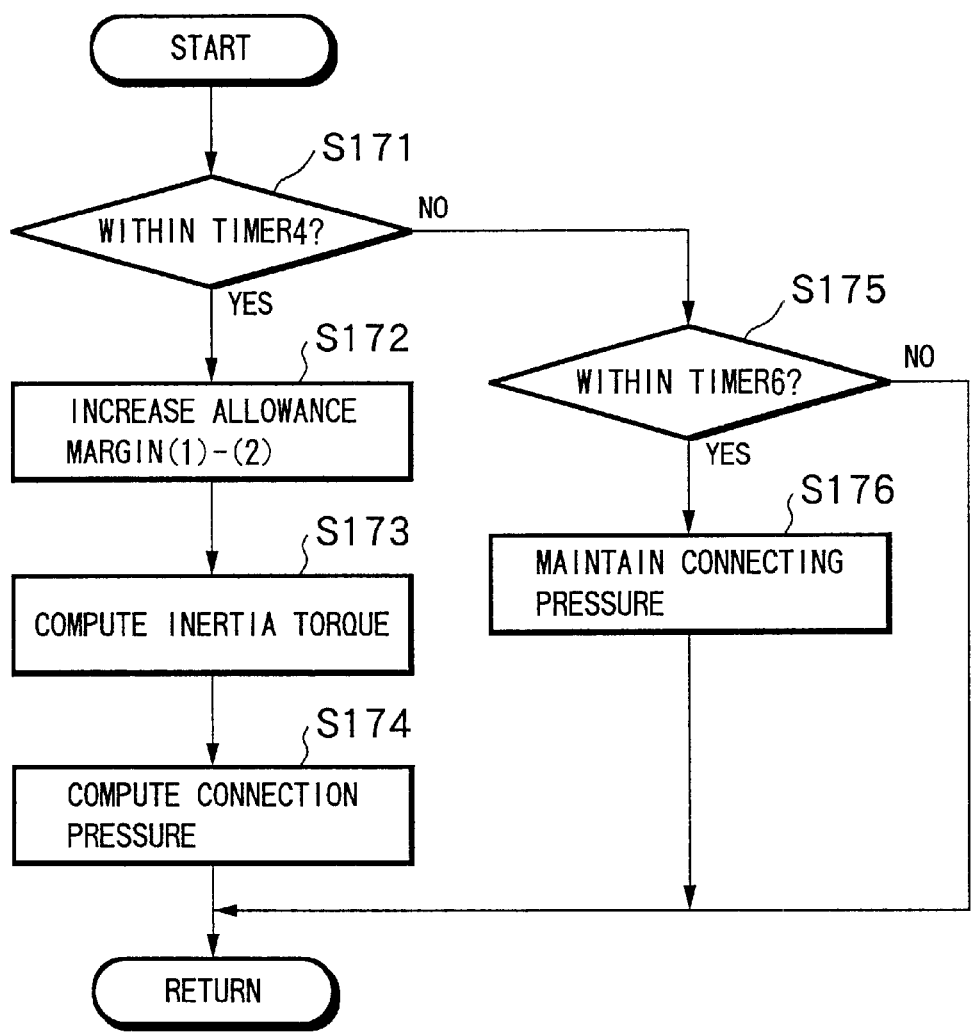
FIG. 19 is a flowchart showing the connection-side control during the torque phase of the power-on downshift transmission operation.

On the other hand, the torque phase process for the connecting side is shown in the flowchart of FIG. 19.

In step S171, determination is made on whether or not the time is within a predetermined time TIMER4 from the starting of the torque phase process. When the time is within the predetermined time TIMER4, the procedure is advanced to step S172. In this step, the pressure is varied from the allowance margin (1) to an allowance margin (2) by a fixed speed within the predetermined time TIMER4. Along with the rise of the allowance margin, the indication pressure for the connection side is increased.

In step S173, the hydraulic pressure corresponding to the inertia torque is computed. In step S174, the pressure corresponding to the inertia torque is added to the basic pressure set to vary by a fixed speed from the allowance margin (1) to the allowance margin (2) within the predetermined time TIMER4. Thereby, the final connection-side hydraulic pressure is determined.

The reason for adding the pressure corresponding to the inertia torque is because during the inertia phase, the release-side hydraulic pressure is controlled to be lower than the pressure corresponding to the estimated value of the input shaft torque, foreseeing the torque used for increasing the rotation. However, when the transmission operation terminates, the torque used for increasing the rotation speed no longer exists, and there is a need to secure the transmission operation torque capacity at the connection side corresponding to the lost torque.

When predetermined time TIMER4 has passed, the procedure is advanced to step S175, where determination is made on whether or not a predetermined time TIMER6 has passed counting from the time the predetermined time TIMER4 had passed.

If predetermined time TIMER6 has not yet passed from lapse of the predetermined time TIMER4, the procedure is advanced to step S176, where a process is performed for maintaining the connection-side pressure to the pressure equal to when predetermined time TIMER4 has passed.

When predetermined time TIMER6 has passed, the procedure is advanced to a termination phase, wherein during a predetermined time TIMER7, the pressure is gradually increased to a hydraulic pressure value obtained by multiplying a predetermined value to the hydraulic pressure equal to when predetermined time TIMER6 has passed. Thereby, when predetermined time TIMER7 has passed, the hydraulic pressure is increased by steps to the maximum pressure.

On the other hand, when the transmission operation is a power-off upshift transmission operation, with Tt–Tinr being equal to or below a predetermined value, and when the release-side element is selected as the main control element (power-off upshift transmission operation (2)), similar to the power-on downshift transmission operation control, the transmission operation is performed by controlling the release-side friction engagement element, before connecting the connection-side friction engagement element. However, since inertia torque is generated along with the reduction of rotation during transmission operation, the release-side hydraulic pressure is increased by what corresponds to the inertia torque, while the connection-side hydraulic pressure during the torque phase is decreased by what corresponds to the inertia torque.

We claim:

1. A transmission control device for an automatic transmission, wherein a transmission operation is performed by alternating the connection between friction engagement elements, in which the connection control and the release control of different friction engagement elements are carried out simultaneously, said transmission control device including:
    an input shaft rotation speed detecting means for detecting the input shaft rotation speed of a transmission mechanism; and
    a power on/off determining means for determining whether the transmission operation is a power-on state transmission operation or a power-off state transmission operation, based on a direction to which said input shaft rotation speed changes when release control of a release-side friction engagement element starts, said power on/off determining means determining that the transmission operation is a power-on state transmission operation when said input shaft rotation speed is increased, and determining that the transmission operation is a power-off state transmission operation when said input shaft rotation speed is reduced.

2. A transmission control device for an automatic transmission, wherein a transmission operation is performed by alternating the connection between friction engagement elements, in which the connection control and the release control of different friction engagement elements are carried out simultaneously, said transmission control device including:
    an input shaft rotation speed detecting means for detecting the input shaft rotation speed of a transmission mechanism;
    a reference speed computing means for computing a reference input shaft rotation speed based on the gear level before the transmission operation and the output shaft rotation speed of the transmission mechanism; and
    a power on/off determining means for determining whether the transmission operation is a power-on state transmission operation or a power-off state transmission operation, based on a direction to which said input shaft rotation speed changes when release control of a release-side friction engagement element starts,
    said power on/off determining means determining that the transmission operation is a power-on state transmission operation when said input shaft rotation speed becomes greater than said reference input shaft rotation speed, and determining that the transmission operation is a power-off state transmission operation when said input shaft rotation speed becomes smaller than said reference input shaft rotation speed.

3. A transmission control method for an automatic transmission, wherein a transmission operation is performed by alternating the connection between friction engagement elements, in which the connection control and the release control of different friction engagement elements are carried out simultaneously, said transmission control method including the steps of:
    detecting the input shaft rotation speed of a transmission mechanism;
    determining the direction to which the rotation speed of said input shaft has changed when release control of a release-side friction engagement element is started;
    determining whether the transmission operation is a power on state transmission operation or a power-off state transmission operation, based on a direction to which said input shaft rotation speed has changed;
    selecting a transmission process from different transmission processes depending on whether said transmission operation is a power-on state transmission operation or a power-off state transmission operation; and
    controlling the transmission operation based on said selected transmission process.

4. The transmission control method for an automatic transmission according to claim 3, wherein,
    said step fore determining whether the transmission operation is a power-on state transmission operation or a power-off state transmission operation determines that the transmission operation is a power-on state transmission operation when said input shaft rotation speed is increased, and determines that the transmission operation is a power-off state transmission operation when said input shaft rotation speed is reduced.

5. The transmission control method for an automatic transmission according to claim 3, further including:
    a step for computing a reference input shaft rotation speed based on the gear level before the transmission and the output shaft rotation speed of the transmission mechanism; and said step for determining whether the transmission operation is a power-on state transmission operation or a power-off state transmission operation determines that the transmission operation is a power-on state transmission operation when said input shaft rotation speed becomes greater than said reference input shaft rotation speed, and determines that the transmission operation is a power-off state transmission operation when said input shaft rotation speed becomes smaller than said reference input shaft rotation speed.

6. The transmission control method for an automatic transmission according to claim 3, further including:

a step for computing a reference input shaft rotation speed based on the gear level before the transmission operation and the output shaft rotation speed of the transmission mechanism; and a step for determining whether the transmission operation is an upshift transmission or a downshift transmission operation; wherein said step for determining whether the transmission operation is a power-on state transmission operation or a power-off state transmission operation determines that when said input shaft rotation speed is changed toward a direction approximating said reference input shaft rotation speed, the transmission operation is a power-off state transmission operation if it is an upshift transmission operation, and the transmission operation is a power-on state transmission operation if it is a downshift transmission operation; and when said input shaft rotation speed is changed toward a direction deviating from said reference input shaft rotation speed, the transmission operation is a power-on state transmission operation if it is an upshift transmission operation and the transmission operation is a power-off state transmission operation it is a downshift transmission operation.

7. The transmission control method for an automatic transmission according to claim 3, wherein:

said step for selecting the transmission process selects either the release-side friction engagement element or a connection-side friction engagement element as the main object of control when changing the gear ratio to a post-transmission gear ratio, depending on whether the transmission operation is a power-on state transmission operation or a power-off state transmission operation.

8. The transmission control method for an automatic transmission according to claim 6, wherein:

said step for selecting the transmission process selects, as the main object of control for changing the gear ratio to a post-transmission operation gear ratio, the release-side friction engagement element when the transmission operation is a power-on state downshift transmission operation, the connection-side friction engagement element when the transmission operation is a power-off state downshift transmission operation and the connection-side friction engagement element when the transmission operation is a power-on state upshift transmission operation; and when the transmission operation is a power-off state upshift transmission operation selects the connection-side friction engagement element when the input shaft torque is greater than a reference predetermined torque, and the release-side friction engagement element when the input shaft torque is smaller than said reference predetermined torque.

9. The transmission operation control method for an automatic transmission operation according to claim 8, further including:

a step for setting the reference torque as a value obtained by, adding a threshold and an intertia torque set according to the transmission operation time.

* * * * *